(12) United States Patent
Mamidwar et al.

(10) Patent No.: US 12,457,177 B1
(45) Date of Patent: Oct. 28, 2025

(54) SYSTEMS FOR AND METHODS FOR QUEUE MANAGEMENT FOR LATENCY CONTROL

(71) Applicant: Avago Technologies International Sales Pte. Limited, Singapore (SG)

(72) Inventors: Rajesh Shankarrao Mamidwar, San Diego, CA (US); Xuemin Chen, Rancho Santa Fe, CA (US); Yong Li, San Diego, CA (US); Michael Glik, Kfar Saba (IL); Yoram Gorsetman, Kadimah (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/651,320

(22) Filed: Apr. 30, 2024

(51) Int. Cl.
*H04L 47/56* (2022.01)
*H04L 47/6275* (2022.01)

(52) U.S. Cl.
CPC ........ *H04L 47/562* (2013.01); *H04L 47/6275* (2013.01)

(58) Field of Classification Search
CPC .......................... H04L 47/562; H04L 47/6275
See application file for complete search history.

(56) References Cited

U.S. PATENT DOCUMENTS

| 10,938,734 | B1 | 3/2021 | Nelson et al. |
| 2020/0053018 | A1 | 2/2020 | White et al. |
| 2021/0014177 | A1* | 1/2021 | Kasichainula ........ H04L 49/901 |
| 2022/0061129 | A1* | 2/2022 | Pani ........................ H04L 12/66 |

(Continued)

FOREIGN PATENT DOCUMENTS

EP  3 073 680 B1  12/2017

OTHER PUBLICATIONS

De Schepper Bell Labs B Briscoe Ket Al: "DualQ Coupled AQM for Low Latency, Low Loss and Scalable Throughput; draft-briscoe-aqm-dualq-coupled-00,txt", DualQ Coupled AQM for Low Latency, Low Loss and Scalable Throughput; Draft-Briscoe-AQM-DualQ-Coupled-00,TXT, Internet Engineering Task Force, IETF; Standardworkingdraft, Internet Society (ISOC) 4, Rue Des Falaises CH-1205 Geneva, Switzerland, Aug. 7, 2015 (201s -?oa-01), pp. 1-22.

(Continued)

*Primary Examiner* — Benjamin M Thieu
(74) *Attorney, Agent, or Firm* — Foley & Lardner LLP

(57) ABSTRACT

Queue management for latency control is provided. A method includes receiving packets of multiple flows, each of the packets including an arrival time stamp. The method can include classifying, based on a type of application, the flows for transmission as higher priority via a higher priority channel, or lower priority via a lower priority channel. The method can include determining, for packets for the flows classified as higher priority, a queue of one or more second queues to use for transmission and a departure time stamp for each of the packets according to a latency budget for the type of application. The method can include communicating the higher priority packets with the departure time stamp to a corresponding queue of the one or more second queues based on the type of application. A transmission scheduler can prioritize transmission of packets from the second queues based on the departure time stamp.

20 Claims, 13 Drawing Sheets

(56) References Cited

U.S. PATENT DOCUMENTS

2024/0007707 A1* 1/2024 He ................... H04N 21/8456
2025/0113238 A1* 4/2025 Gopala ............. H04W 28/0231

OTHER PUBLICATIONS

Extended European Search Report on EP Appln No. 25172912.5 dated Aug. 14, 2025.
Hao Wang et al: "Per-Flow Queue Management with Succinct Priority Indexing Structures for High Speed Packet Scheduling", IEEE Transactions On Parallel and Distributed Systems, IEEE, USA, vol. 24, No. 7, Jul. 1, 2013 (Jul. 1, 2013), pp. 1380-1389.

* cited by examiner

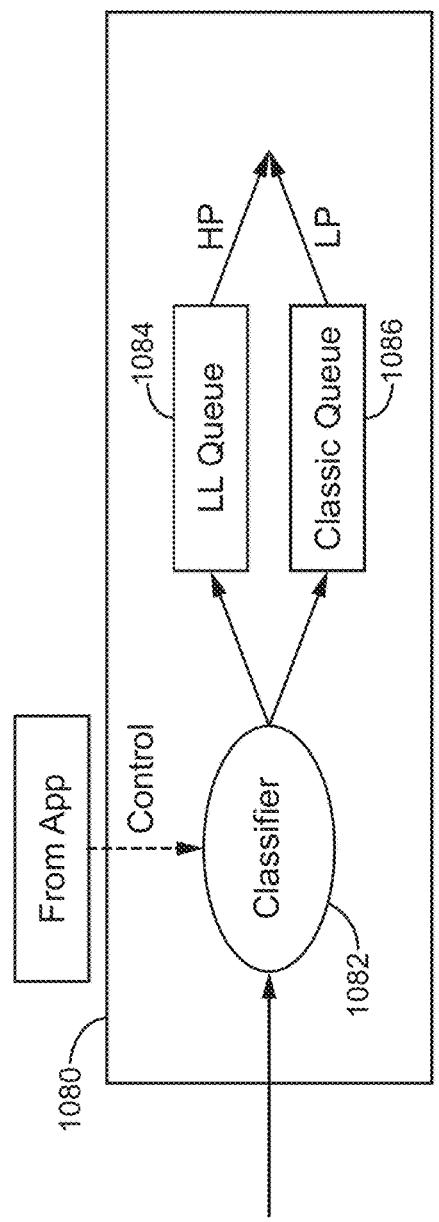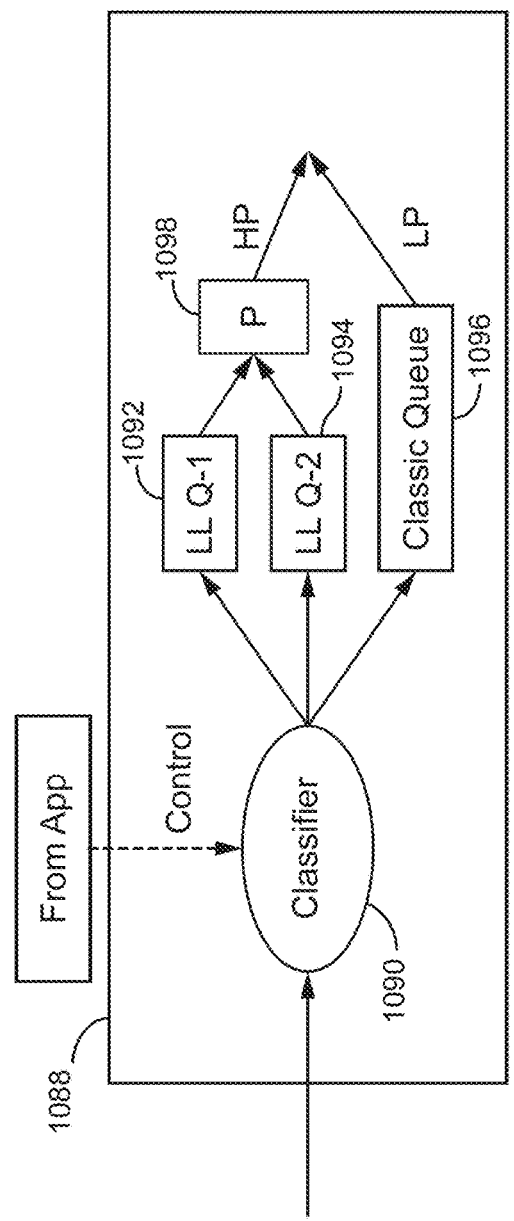

305 Data Stream

330 Queue_3
- 410 ATS: T_1 DTS: T_2
- 430 ATS: T_5 DTS: T_6
- 440 ATS: T_7 DTS: T_10

325 Queue_2
- 405 ATS: T_0 DTS: T_3
- 425 ATS: T_4 DTS: T_7

320 Queue_1
- 415 ATS: T_2
- 420 ATS: T_3
- 435 ATS: T_6

| 410 T_1 | 405 T_0 | 430 T_5 | 425 T_4 | 440 T_7 | 415 T_2 | 420 T_3 | 435 T_6 |
|---|---|---|---|---|---|---|---|
| T_2 | T_3 | T_6 | T_7 | T_10 | 610 → | 615 ↗ | 360 ↖ |
| T_2 | T_3 | T_4 | T_5 | T_6 | T_7 | T_8 | T_9 |

805 Receive packets of multiple flows, each of the packets including an arrival time stamp, the latency controller using a higher priority channel and a lower priority channel to communicate packets from each of the flows, the lower priority channel using a first queue to queue packets for transmission of lower priority packets and the higher priority channel using one or more second queues, each having a latency budget based at least on a type of application, for transmission of higher priority packets.

810 Classify, based at least on the type of application, each of the flows for transmission as either higher priority via the higher priority channel or lower priority via the lower priority channel.

815 Determine, for packets for each of the flows classified as higher priority, a queue of the one or more second queues to use for transmission and a departure time stamp for each of the packets according to the latency budget for the type of application.

820 Communicate each of the higher priority packets with the departure time stamp to a corresponding queue of the one or more second queues based at least on the type of application, wherein a transmission scheduler prioritizes transmission of packets from the one or more second queues based at least on the departure time stamp.

FIG. 8

SYSTEMS FOR AND METHODS FOR QUEUE MANAGEMENT FOR LATENCY CONTROL

FIELD OF THE DISCLOSURE

This disclosure generally relates to systems and methods for queue management. The queues can include queues internal to one or more devices, or across various devices of a networked environment.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large-scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), and code division multiple access (CDMA). As higher data throughput, density of networks, and other changes develop, increasingly latency-sensitive data is provided across various networks. However, network congestion and complexity can impose delay between various communications. For example, a portion of communications latency can relate to periods of time wherein a message is enqueued for transmission or other processing.

SUMMARY

Packets can be associated with various priorities. For example, some packets can include latency sensitive information. Although various methods can enqueue or process packets according to a priority (e.g., a high and low priority) such queues may not meet timeliness constraints of each of a variety of data types. Systems and methods of the present disclosure can manage packet priorities to meet constraints. For example, a first classification can correspond to a first timeliness constraint, a second classification can correspond to a second timeliness constraint, and a third classification can correspond to a third timeliness constraint. The classifier can classify received packets according to the various classifications. An arrival time stamp generator can provide an arrival time stamp incident to a time of arrival. A departure time stamp generator can generate a departure time stamp based on the arrival time stamp and the classification. A controller can sequence the packets according to the departure time stamps.

Various embodiments disclosed herein are related to a method. The method or various operations thereof may be performed by a latency controller on a device. The method can include receiving packets of multiple flows. Each of the packets may include an arrival time stamp. The method can include using a higher priority channel and a lower priority channel to communicate packets from each of the plurality of flows, the lower priority channel using a first queue to queue packets for transmission of lower priority packets and the higher priority channel using one or more second queues for transmission of higher priority packets. One or more queues can have a latency budget based at least on a type of application. The method can include classifying, based at least on the type of application, each of the flows for transmission as either higher priority via the higher priority channel or lower priority via the lower priority channel. The method can include determining, for packets for each of the flows classified as higher priority, a queue of the one or more second queues to use for transmission and a departure time stamp for each of the packets according to the latency budget for the type of application. The method can include communicating each of the higher priority packets with the departure time stamp to a corresponding queue of the one or more second queues based at least on the type of application. A transmission scheduler can prioritize transmission of packets from the one or more second queues based at least on the departure time stamp.

In some embodiments, the method includes including, by the device, the arrival time stamp with each of the packets.

In some embodiments, the method includes determining, by the latency controller, the departure time stamp based at least on the arrival time stamp plus a latency time for the latency budget assigned to each queue of the one or more second queues.

In some embodiments, the method includes classifying the higher priority flows based at least on the type of application being one of video or audio.

In some embodiments, the method includes communicating packets of lower priority flows of packets, without the departure time stamp, to the first queue for the lower priority channel.

In some embodiments, the method includes identifying by the transmission scheduler, for one or more packets in one or more of the second queues, that the departure time stamp has passed and scheduling the one or more packets using a highest priority responsive to the identification of the passed departure time stamp.

In some embodiments, the method includes prioritizing, by the transmission scheduler, packets from the one or more second queues for transmission with an earliest deadline among departure time stamps.

In some embodiments, the method includes re-ordering, by the transmission scheduler, packets for transmission from the one or more second queues based at least on departure time stamps.

In some embodiments, the method includes re-ordering, by the latency controller, packets in the one or more second queues based at least on departure time stamps.

In some embodiments, the first queue and the one or more second queues are implemented on one of a same device. In some embodiments, the first queue and the one or more second queues are implemented across a plurality of different devices.

In some embodiments, the latency controller is on the device comprising one of an access point, a cable modem or a cable modem termination system.

In some embodiments, the method comprises using, by the transmission scheduler, the departure time stamp of packets in the one or more second queues to transmit packets according to one of a pacing mode or a bursting mode.

Various embodiments disclosed herein are related to a system. The system includes a latency controller. The latency controller may be one a device in communication with a first queue for a lower priority channel and one or more second queues for one or more higher priority channels. The queues can communicate packets. Each of the one or more second queues can be associated with a latency budget based at least on a type of application. The latency controller can receive a plurality of packets of a plurality of flows, each of the plurality of packets including an arrival time stamp. The latency controller can use a higher priority channel and a lower priority channel to communicate packets from each of the plurality of flows. The latency controller can use the lower priority channel using a first queue to queue packets for transmission of lower priority packets. The latency controller can use the higher priority channel using one or more second queues, each having a latency budget based at least on a type of application, for transmission of higher priority packets. The latency controller can classify, based at least on the type of application, each of the flows for transmission as either higher priority via the one or more higher priority channels or lower priority via the lower priority channel. The latency controller can determine, for packets for each of the flows classified as higher priority, a queue of the one or more second queues to use for transmission and a departure time stamp for each of the packets according to the latency budget for the type of application. The latency controller can communicate each of the higher priority packets with the departure time stamp to a corresponding queue of the one or more second queues based at least on the type of application. The transmission scheduler can prioritize transmission of packets from the one or more second queues based at least on the departure time stamp.

In some embodiments, the latency controller is configured to determine the departure time stamp based at least on the arrival time stamp plus a latency time for the latency budget assigned to each queue of the one or more second queues.

In some embodiments, the latency controller is configured to classify the higher priority flows based at least on the type of application being one of video or audio.

In some embodiments, the latency controller is configured to include the departure time with each of the packets being communicated to the corresponding queue of the one or more second queues.

In some embodiments, the transmission scheduler is configured to prioritize the transmission of packets from the one or more second queues according to earliest departure time stamps.

Various embodiments disclosed herein are related to a system. The system includes a network device in a computing environment of a first network, the network device providing access to the Internet and one or more second networks to one or more devices in the computing environment of the first network. The system includes a latency controller on the network device. The latency controller is configured to identify an arrival time stamp for packets for a plurality of flows being communicated to the one or more devices. The latency controller is configured to classify, based at least on a type of application, each of the plurality of flows for transmission as either higher priority or lower priority. The latency controller is configured to determine for packets of each of the flows classified as higher priority, a departure time stamp for each of the packets according to a latency budget for the type of application. The latency controller is configured to communicate each of the higher priority packets with the departure time stamp to a corresponding queue of the one or more queues based at least on the type of application for transmission according to the departure time stamp.

In some embodiments, the network device can include at least one of an access point, a cable modem or a cable modem termination system. In some embodiments, a transmission scheduler is configured to prioritize transmission of packets from the one or more queues to the one or more devices according to an earliest departure time.

BRIEF DESCRIPTION OF THE DRAWINGS

Various objects, aspects, features, and advantages of the disclosure will become more apparent and better understood by referring to the detailed description taken in conjunction with the accompanying drawings, in which reference characters identify corresponding elements throughout. In the drawings, like reference numbers generally indicate identical, functionally similar, and/or structurally similar elements.

FIG. 1D is a general schematic block diagram of an application for a communication system illustrated in FIG. 1A according to some embodiments;

FIG. 1E is a general schematic block diagram of an application for a communication system illustrated in FIG. 1A according to some embodiments;

FIG. 4 illustrates an input data stream including various packets, according to some embodiments;

FIG. 5 illustrates a transmission schedule including the various packets of FIG. 4, according to some embodiments;

FIG. 6 illustrates an output data stream including the various packets of FIG. 4 and FIG. 5, according to some embodiments;

FIG. 8 illustrates a flow diagram for a method of queue management for latency control, according to some embodiments.

Figure 1A:
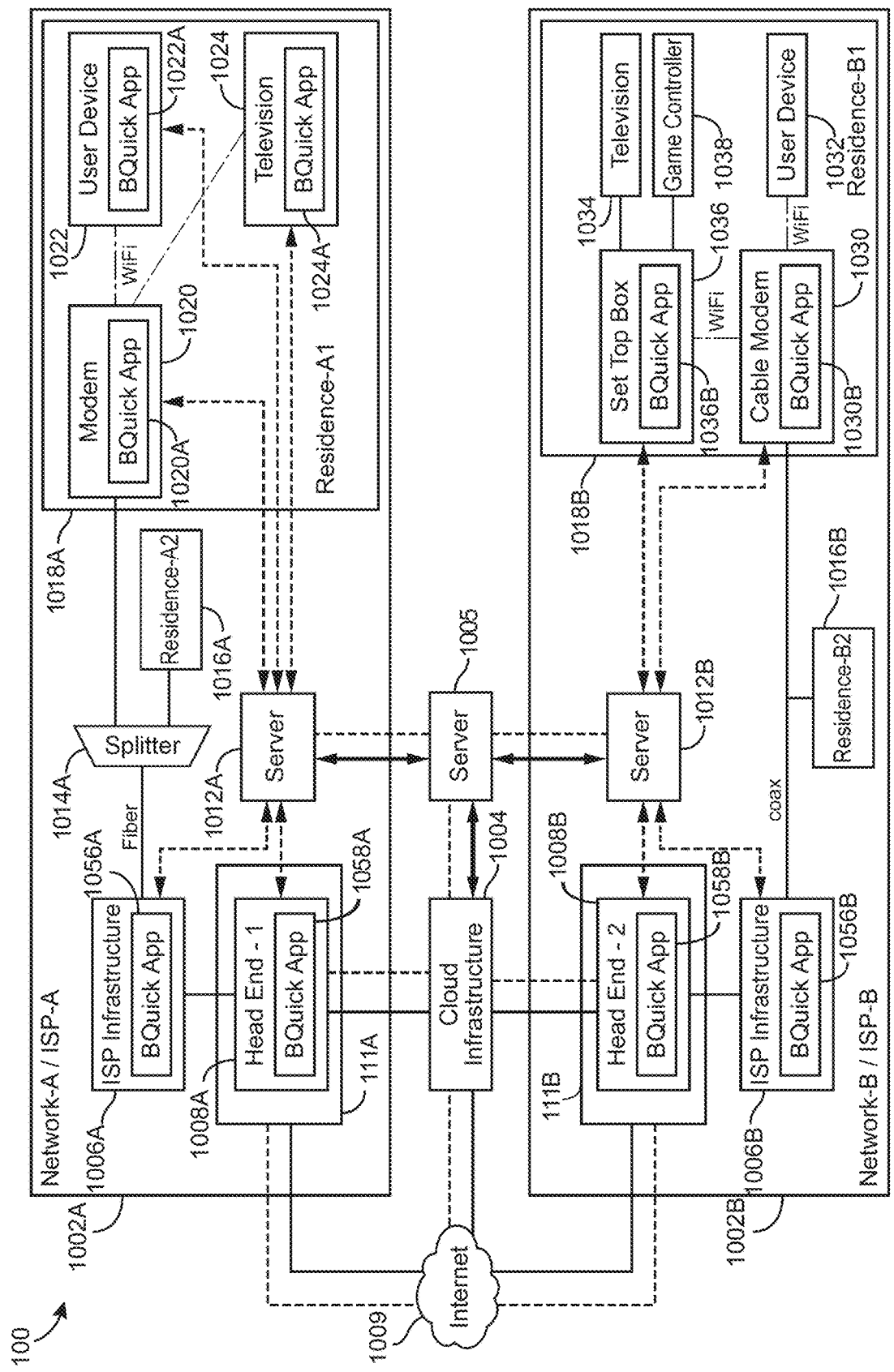
FIG. 1A is a general schematic block diagram of a communication system according to some embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

The following IEEE standard(s), including any draft versions of such standard(s), are hereby incorporated herein by reference in their entirety and are made part of the present disclosure for all purposes: IEEE 802.11™, IEEE 802.14™, IEEE P802.3™ and IEEE Ethernet standard systems including but not limited to LRM, VSR, SR, MR, LR, ZR and KR. Although this disclosure may reference aspects of these standard(s), the disclosure is in no way limited by these standard(s).

Devices provided by ISPs and customer-owned AR/VR setups, mobile phones, OTT devices, and cloud gaming clients are configured for low latency uses in some embodiments. Some embodiments of systems and methods disclosed herein provide a real time or near real time system to monitor end to end latencies. In some applications, timestamp synchronization with applications at intermediate nodes and end devices use precision time protocol (PTP) synchronization protocols for latency monitoring. In some embodiments, latency is monitored from end-to-end so that latency of all devices within the entire end-to-end process is considered, thereby enabling identification of the origins of substantial latency.

In some embodiments, the systems and methods achieve synchronization of the wall clock across all nodes and end-user devices by employing timestamps for low latency data packets at each node. The determination of latency at each node is made by applications at each node. The determination of latency is reported back to a server that communicates with the applications. The systems and methods allow the communication system to distinguish whether latency arises from the home network, an ISP, or cloud servers.

A latency application server extension is integrated into the ISP-provided modem or router in some embodiments. In some embodiments, the server extensions have the ability to filter and transmit all necessary information to the ISP's cloud server or share open data with application developers. The server extension can store or receive information about a customer's low latency plan subscription and can track low latency usages inside the home in some embodiments.

A server extension can refer to a software component or module that extends the functionality of a server application (e.g., a latency application) in some embodiments. Server extensions can be used in various server environments such as web servers, application servers, ISP servers, and database servers to enhance their capabilities or to add specific features tailored to the needs of users or applications and can be installed using extension files. The extensions can be installed on any of the devices discussed herein. In some embodiments, the extensions are provided on an ISP controlled server in the cloud, an ISP controlled modem or access point, a third party WiFi access point, a third party modem, or ISP provided low latency devices.

In some embodiments, the server extension allows a user to select device applications for different latency treatment. A server within the residence can use classifiers and queues to reduce latency for low latency devices. The server can be part of a router, set top box, hub, etc. in some embodiments. The server extensions support multiparty involvement (e.g., cloud managers, ISPs, application developers and silicon vendors) for end to end usages in some embodiments.

With respect to latency, generally, latency refers to an amount of time a system, application or device takes to process and respond to a request in some embodiments. With respect to low latency, low latency refers to such amount of time being within a threshold, a performance level, a user experience level or requirements of the application or usage in some embodiments. The threshold, performance level, user experience level or requirements of the application may vary based on context, such as a type of application and/or use case and the systems, networks, and computer environment for which such use cases and/or application operate or execute. Low latency from a perspective of a computing environment refers to an ability of a computing system or network to provide responses without unacceptable or unsuitable delay, or otherwise minimal delay, for the context or use case of which such responses are provided. System criteria and application parameters can affect a threshold for low latency. The threshold can be fixed or variable (e.g., depending upon conditions or actual needs or requirements at a particular time). With respect to low latency networks and systems in a context of network and network communication, low latency describes a computer network, systems and environment that is designed, configured and/or implemented to support applications, network traffic and processing operations to reduce, improve latency or to meet a low latency threshold. End-to-end latency refers to latency between two points in a network or communication system. The two points can be a source of data and a consumer of data, or intermediate points therebetween in some embodiments.

A low latency device refers to any hardware, device component, or system that has low latency considerations or requirements in some embodiments. A low latency device can be a telecommunications, remote control systems, gaming, audio processing, financial trading, augmented reality and/or virtual reality device where delays can impact user experience or system performance. There may be levels of low latency requirements where one low latency device has a more stringent requirement than another low latency device in some embodiments. A low latency path refers to a path for low latency operation in some embodiments. Latency data refers to any indication of latency associated with a communication or configuration data for low latency operation or control in some embodiments. A low latency application refers to the use or performance of a low latency operation in some embodiments. A low latency device or software program can be used to perform the low latency operation (video conferencing, cloud gaming, augmented reality/virtual reality (AR/VR) applications, and metaverse applications).

Some embodiments relate to a system including a first device and an application. The application operates on the first device and is configured to append time stamps to a first packet received by the first device. The time stamps indicate a first time the first packet is received by the first device and a second time the first packet is sent by the first device. Append refers to adding or attaching information to a data structure (e.g., a packet) in some embodiments.

In some embodiments, the application is configured to determine latency information associated with communication through the first device using the time stamps. The time stamps include a first time stamp for the first time and a second time stamp for the second time. In some embodiments, the application is configured to provide a second packet including the latency information and communicate the second packet to a server remote from the first device via a virtual communication link. In some embodiments, the first time stamp is an ingress time stamp and the second time stamp is an egress time stamp.

In some embodiments, the time stamps are provided as part of a precision time protocol. In some embodiments, the first packet is for use in a low latency operation. In some embodiments, the time stamps are derived from a satellite time source. In some embodiments, the latency information includes a history of time stamps. In some embodiments, the first device is a user device, cloud infrastructure, internet service provider infrastructure, a set top box, a cable modem, or a wireless router.

Some embodiments relate to a non-transitory computer readable medium having instructions stored thereon that, when executed by a processor, cause a processor to receive a first packet from a first node. The first packet includes latency information associated with a second packet provided to the first node for a low latency application. The instructions also cause the processor to provide a third packet to the first node or other nodes to increase priority for packets for the low latency application if the latency information indicates that a latency threshold for the low latency application has not been met. The first node can be part of a communication system including a cable, fiber optic, or wireless network. The other nodes and the first node are in path associated with the second packet provided to the first node for the low latency application.

In some embodiments, the processor is disposed on a server remote from the first node. In some embodiments, the server is in communication with internet service provider infrastructure and the third packet is provided to the internet service provider infrastructure. In some embodiments, the third packet is provided to internet service provider infrastructure, a set top box, a cable modem, or a wireless router.

In some embodiments, the instructions cause the processor to provide a fourth packet to the first node or the other nodes to decrease priority for packets for the low latency application if the latency information indicates that the latency threshold for the low latency application has been met and additional bandwidth is available.

In some embodiments, the latency information comprises a user identification.

Some embodiments relate to a method of providing low latency service. The method includes providing a first time stamp for a first packet provided to a first device. The first packet can be for reception by a low latency device or as being for use in a low latency operation. The method also includes providing a second packet including latency information to a server remote from the first device via a virtual communication link.

In some embodiments, the method also includes providing a second time stamp for the first packet provided to the first device. In some embodiments, the first time stamp is an ingress time stamp and the second time stamp is an egress time stamp. In some embodiments, the first device includes an application configured to append the first time stamp to the first packet.

Some embodiments relate to a server. The server includes a first application configured to monitor end-to-end latency for a network. The network includes devices. The application is configured to receive latency information from at least one of the devices. The latency information includes time stamps or time period data for a packet to communicated across a device or a link. Monitoring or monitor refers to an action where performance is observed, checked, and/or recorded and can generally occur over a period of time.

A non-transitory computer readable medium have instructions stored thereon that, when executed by a processor, cause the processor to receive a first packet from a first node. The first packet includes latency information associated with a second packet provided to the first node for a low latency application. The instructions also cause the processor to provide a subscription offer in response to the latency information. The first node is part of a communication system comprising a cable, fiber optic, or wireless network. The other nodes and the first node are in path associated with the second packet provided to the first node for the low latency application.

In some embodiments, the first device is a set top box, a cable modem, or a wireless router. A device can refer to any apparatus, system, or component for performing an operation in some embodiments. A low latency device can refer to any device capable of performing a low latency operation. A low latency operation refers to an operation where higher than low latency operation can affect performance level, user experience level or a requirement of the application or use in some embodiments. A packet refers to a unit of data that is transmitted over a network in some embodiments. The packet can include a header and a payload. Time stamps and latency information can be appended to a packet in some embodiments. Classify or classifying may refer to any operation for determining a classification, grouping or arrangement in some embodiments. For example, a packet can be classified as being for a low latency device or application by reviewing an address, appended data, by its type of data, or other information in some embodiments. Bandwidth may refer to an amount of capacity for communication in some embodiments. Priority refers to a precedence, hierarchical order, level, or other classification in some embodiments. For example, packets can be ordered for transmission in accordance with a priority associated with a latency requirement in some embodiments. A cable, fiber optic, or wireless network refers to any network that uses one or more of a fiber optic cable, a coaxial cable, an ethernet cable, other wire, or wireless medium in some embodiments.

For purposes of reading the description of the various embodiments below, the following descriptions of the sections of the specification and their respective contents may be helpful:

Section A describes a communication system that may be useful for practicing the embodiments described herein.

Section B describes low latency applications that may be useful for practicing the embodiments described herein.

Section C describes embodiments of network environments and computing environments that may be useful for practicing the embodiments described herein.

Section D describes embodiments of systems and methods of queue management for latency control.

A. Communication System

Network latency can significantly impact internet connectivity, user experience, and the performance of various online applications and services. Some embodiments provide information for ISPs to address end-to-end latency issues through network optimization, infrastructure upgrades, and efficient routing to ensure a reliable and responsive internet experience for their customers. In some embodiments, tools are provided so that cloud servers of ISPs can collect analytics data and can re-configure ISP provided devices like cable modems, GPON modems or set top boxes. In some embodiments, the systems and methods allow multiple parties (e.g., more than one ISP, cloud service providers, public switch operators, and application developers) to address low latency usages including but not limited to video conferencing, augmented reality (AR)/virtual reality (VR), and metaverse end to end usage. In some embodiments, the systems and methods allow multiple parties to cooperate and work together to address latency issues. In some embodiments, the systems and methods can be used with Wi-Fi networks, Ethernet networks, modems, access network, backbone networks, IXPs, and cloud infrastructure and allow multiple teams to work together for latency optimizations across various mediums.

In some embodiments, a latency monitor measures and reports latency for each link, device, and end application. The reports are provided to controllers of the paths, such as, ISPs, application developers, end users, etc. so that actions can be taken once low latency requirements are not met. In some embodiments, systems and methods provide a seamless latency monitoring, analysis, and optimization. The analysis of latency measurements and reporting allows for identification of latency contributors in real time and optimization by mapping traffic requiring low latency traffic to low latency queues or paths. In some embodiments, devices in the path are provided with an application (e.g., software) for effecting monitoring, analysis, and optimization. The analysis of latency measurements and reporting allows for control of devices to appropriately provide low latency traffic to low latency queues or paths. The applications can be in communication with a latency server (e.g., a server for the applications) that coordinates operations and accumulates data according to the monitoring, analysis, and optimization operations. An application or app may refer to a software program or module configured to perform specific functions or tasks on an electronic device.

With reference FIG. 1A a communication system 100 includes a network 1002A for residences 1016A and 1018A, a network 1002B for residences 1016B and 1018B, a cloud infrastructure 1004, and a BQUICK_TOP server 1005. Communication system 100 advantageously is configured so that information is provided to ISPs to address latency issues through network optimization, infrastructure upgrades, service upgrades and/or efficient routing to ensure a reliable and responsive internet experience for customers can be achieved on networks 1002A and 1002B. BQUICK_TOP server 1005 is configured to receive the information and address latency issues in some embodiments. BQUICK_TOP server 1005 is in communication (e.g., via direct or virtual connections) with cloud infrastructure 1004 and networks 1002A and B (residences 1016A-B and 1018A-B) to share information, reports, commands, and other data in some embodiments. BQUICK_TOP server 1005, infrastructure 1004 and residences 1016A-B and 1018A-B can utilize any form of communication mediums, networks, protocols, etc. to communicate data and information.

Cloud infrastructure 1004 includes a collection of hardware, software, networking, and other resources that enable the delivery of cloud computing services over the internet in some embodiments. Cloud infrastructure 1004 includes physical servers, storage devices, networking equipment, and other hardware components hosted in data centers distributed across multiple geographic locations in some embodiments. The data centers are equipped with high-performance servers, storage arrays, and networking gear to support the computing needs of cloud services in some embodiments. The cloud infrastructure 1004 is configured to provide high-speed, redundant network links, routers, switches, and content delivery networks (CDNs) for delivery of low-latency, high-bandwidth content for users in some embodiments. Cloud infrastructure 1004 includes block storage (e.g., Amazon EBS, Azure Disk Storage), object storage (e.g., Amazon S3, Google Cloud Storage), and file storage (e.g., Amazon EFS, Azure Files) in some embodiments.

Residences 1016A and 1018A can include a network associated with a first ISP and residences 1016B and 1018B can include a network associate with the same ISP or a second ISP. In some embodiments, the networks for residences 1016A and 1018A and residences 1016B and 1018B are part of broadband access server (BAS) networks. Network 1002A includes infrastructure 1006A, a head end 1008A, a BQUICK ISP_A server 1012A, splitter 1014A, equipment for residence 1016A and equipment for residence 1018A. Equipment for residence 1018A includes an optical network unit (ONU) 1020, a user device 1022, and a television 1024. Modem or optical network unit 1020 can be a fiber optic router, switch, gateway etc. and have WiFi capabilities for a WiFi network associated with residence 1018A in some embodiments. Optical network unit 1020 is a GPON modem or optical network terminal (ONT) in some embodiments. GPON is a technology that allows for high-speed internet access over fiber optic cables. Optical network unit 1020 converts the optical signals transmitted over the fiber optic cables into electrical signals and/or radio frequency signals that can be used by devices in residence 1018A. Although system 100 is shown communicating via coaxial cable and optical cable, ground based wireless communications and satellite communications can be utilized in system 100. Optical network unit 1020 is generally provided by an optical network operator (ISP-A) and can be referred to as an optical network termination. BQUICK_TOP server 1005 and BQUICK ISP_A server 1012A can be Broadcom Analytics System (BAS Servers) that collect analytics data from various devices like modems, set top boxes, and other devices.

User device 1022 is a smart phone, AR/VR device, tablet, lap top computer, smart watch, exercise equipment, smart appliance, camera, headphone, automobile, another computing device, etc. Residence 1016A can have similar devices to residence 1018A. Television 1024 and user device 1022 communicate with optical network unit 1020 via a wireless network or wired connections. In some embodiments, optical network unit 1020 can include an ethernet router including wired connections to user device 1022, wireless modems, and television 1024.

Head end 1008A includes routers, switches, servers, and/or other infrastructure for communicating between ISP infrastructure 1006A and cloud infrastructure 1004. ISP infrastructure 1006A includes routers, switches, servers, and/or other infrastructure for communicating between head end 1008A and splitter 1014A. Splitter 1014A communicates via fiber optic cables between infrastructure 1006A and residences 1016A and 1018A, BQUICK ISP_A 1012A BQUICK_TOP server 1005 communicates with server 1012, infrastructure 1006A, head end 1008A and residences 1016A and 1018A via direct or indirect communication (e.g., via the Internet).

Splitter 1014A is a fiber optic splitter in some embodiments. Splitter 1014A can be used in fiber optic networks to divide an incoming optical signal into multiple separate signals for residences 1016A and 1018A and unify signals into one or more signals for infrastructure 1006A. Splitter 1014A can be configured for a passive optical network (PON) architecture. Bidirectional communication occurs across splitter 1014A in some embodiments. In some embodiments, splitter 114 is a conducting cable-type splitter (e.g., for a coaxial, not optical cable). Splitter 114 includes repeaters, amplifiers, signal conditioners, etc. in some embodiments.

BQUICK ISP_A server 1012A a computing device, such as a machine equipped with one or more processors, memory, and storage drives. BQUICK ISP_A server 1012A delivers assorted services to customers (e.g., residences 1016A and 1018A) for the ISP in some embodiments. BQUICK_TOP server 1005 is configured as a central hub responsible for managing and routing internet traffic for its subscribers. BQUICK ISP_A server 1012A handles requests from users such as accessing websites, sending emails, streaming content, and downloading files. BQUICK ISP_A server 1012A manages network protocols, assigns IP addresses, and facilitates communication between different devices on the internet. BQUICK ISP_A server 1012A includes operating systems like Linux or Windows Server, along with networking software such as routing protocols (e.g., BGP, OSPF), DNS (Domain Name System) servers, dynamic host configuration protocol (DHCP) servers for IP address allocation, and firewall/security software to protect system 100 from cyber threats. BQUICK ISP_A server 1012A employs traffic shaping and quality of service (QoS) mechanisms to prioritize and optimize internet traffic, ensuring a smooth and consistent user experience for all subscribers. These operations can involve managing bandwidth allocation, prioritizing certain types of traffic (e.g., VoIP or video streaming), and mitigating network congestion during peak usage periods and can be performed in response to information from server 1012. BQUICK ISP_A server 1012A employs monitoring tools or applications to continuously analyze traffic data to detect anomalies, troubleshoot network issues, and ensure compliance with service level agreements (SLAs) and regulatory requirements in some embodiments.

BQUICK_TOP server 1005 is a computing device similar to and is configured to communicate with servers 1012A and 1012B. BQUICK_TOP server 1005 includes software advantageously configured to address latency issues through network optimization, infrastructure upgrades, and efficient routing to ensure a reliable and responsive internet experience for their customers in some embodiments. BQUICK_TOP server 1005 can receive logs of network activity, including but not limited to traffic patterns, usage statistics, and security events from servers 1012A and 1012B in some embodiments. BQUICK_TOP server 1005 employs monitoring tools to continuously analyze traffic data to detect anomalies, troubleshoot network issues, and ensure compliance with service level agreements (SLAs) and regulatory requirements in some embodiments. In some embodiments, BQUICK_TOP server 1005 is a platform configured to perform latency monitoring in real time, latency analysis in real time, and latency optimization in real time. In some embodiments, the latency optimization is performed to provide a report indicating latency issues. BQUICK_TOP server 1005 can configure paths in networks 1002A and 1002B and controls devices in networks 1002A and 1002B so that low latency requirements are met in some embodiments.

BQUICK_TOP server 1005 and BQUICK ISP_B server 1012B are similar to BQUICK ISP_A server 1012A and is configured for operation with residences 1016B and 1018B. Residences 1016A, 1018A, 1016B and 1018B are similar to each other and can include similar devices. Residence 1018B includes a cable modem 1030B, a set top box 1036B, a game controller 1038, a television 1034 and a user device 1032. User device 1032 is similar to user device 1022. Head end 1008B is similar to head end 1008A, and ISP infrastructure 106B is similar to ISP infrastructure 1006A. Televisions 1024 and 1034 are monitors, smart televisions, or other audio/video equipment. Networks 1002A and 1002B can include cameras, security equipment, fire and safety equipment, smart appliances, etc. in communication with infrastructure 1006A and 106B in some embodiments. ISP infrastructure 1006A and 106B can each include fiber optic cable, coaxial cable, remote nodes, splitters, and other equipment for cable customers in some embodiments. The equipment can include amplifiers, remote physical devices or layers and remote media access control devices or layers. Intermediate nodes in ISP infrastructure 1006A and 106B can process data packets and monitor latency and traffic at various points in network. BQUICK_TOP server 1005, BQUICK ISP_B server 1012B, BQUICK_ISP_A server 1012A are controlled by ISPs (e.g., respective ISPs) in some embodiments.

ISP infrastructure 106B is coupled to residences 1016B and 1018B via a coaxial cable in some embodiments. Cable modem 1030B is a device configured to connect devices in residence 1018B to the ISP infrastructure 106B. Cable modem 1030 includes a computer, router, gateway, or other communication device in some embodiments. Modem 1030 can be configured to provide a wireless network for communicating with devices in residence 1018B. Repeaters, amplifiers, signal conditioners, etc. can be provided on the cable associated with modem 1030 in some embodiments. Cable modem refers to any device for communicating across a cable in some embodiments. Optical network unit 1020 and modem 1030 provide data connection to the ISPs data pipe over fiber or cable. All devices inside the home can be connected to the modem over Wi-Fi or Ethernet for internet connectivity. Each node (e.g., routers, repeaters, modems, Wi-Fi access points) inside the home can introduce latency. ONU 1020 and modem 1030 can be any device at a home or business that connects networking devices to ISPs provided internet data pipe over coaxial cable, fiber optic cable or digital subscriber line (DSL) or cell connection (e.g., via a tower (e.g., 5G, LTE modem)) in some embodiments.

Set top box 1036 is configured to receive and decode digital television signals for viewing on television 1034. Set top box 1036 can be configured for gaming operations and can communicate with a game controller 1038. Set top box 1036 can also be configured to provide internet access, shopping services, home automation, audio features, screen mirroring, etc. Set top box 1036 includes one or more processors, memory, dedicated graphics processing units (GPUs), and/or storage capacity for storing games, applications (apps), latency data, and recorded content in some embodiments. Set top box refers to any device that connects to a television set or monitor and allows users to receive and decode video signals. A set top box can serve as an interface between a television set and various broadcast media sources, such as cable, satellite, or internet-based streaming services in some embodiments. A dashed line in the drawings can represent a virtual connection and a solid line can represent a physical connection (e.g., wires or fiber optic cable).

The cloud infrastructure 1004, head end 1008A, and head end 1008B are in communication with the internet 1009 virtually or directly. Head end 1008A and head end 1008B can be associated with buildings 111A and 111B, respectively. Communication system 100 is generally an end-to-end combination of networking elements used for networking traffic from a home or business to internet 1009 (e.g., public internet) in some embodiments. In some embodiments, cloud infrastructure 1004 is a set multiple servers, switches, storage units. ISPs can have pool of data center/cloud servers co-located with head ends 1008A and 1008B or dedicated links to cloud infrastructure 1004 from head ends 1008A and 1008B and head end connections to internet 1009.

Although cloud infrastructure 1004 is shown as single block, cloud servers, data servers can be collocated with ISP head ends 1008A and/or 1008B. The cloud servers can be at third party private facility and ISPs can have dedicated physical links or links via internet 1009. Depending on congestion and server processing capabilities, cloud infrastructure 1004 can be a source of latency. Cloud server processing elements can be upgraded to support latency monitor applications (e.g., BQUICK applications) or can configure devices to support low latency services in some embodiments. Head ends 1008A and 1008B can be a central facility (e.g., a central office. A head end refers to a facility where internet data or audio/video content is received, processed, and routed to end subscribers like residential or business owners in some embodiments. Head ends 1008A and 1008B can have multiple switching, routing, data metering, queuing, security elements, and/or other devices which can introduce the latencies. Head ends 1008A and 1008B can also host Cable Modem Termination Systems (CMTS) in a cable network, DSLAM (Digital Subscriber Line Access Multiplexor) in a DSL network, and OLT (Optical Line Terminal) in a fiber network.

Networks 1002A and 1002B is operated by one of as ISP-A and ISP-B. ISPs extend their services to various residences or businesses within communities, cities, or specific regions. Networks 1002A and 1002B represents two distinct networks served by same or different ISPs, which may be situated in the same neighborhood or entirely different regions or countries. Homeowners or business proprietors seek out ISPs offering services in their local areas and subscribe to internet service accordingly.

B. Applications

System 100 advantageously includes an ISP infrastructure BQUICK application 1056A for ISP infrastructure 1006A, a head end BQUICK application 1058A for head end 1008A, a modem BQUICK application 1020A for optical network unit 1020, a user device BQUICK application 1022A for user device 1022, and a television BQUICK application 1024A for television 1024. Applications 1056A, 1058A, 1020A, 1022A, and 1024A can be software apps or programs designed to perform specific tasks or provide particular functions as described herein (e.g., latency monitoring, latency analysis, and latency optimization and the communication and storage of data related thereto). Applications 1056A, 1058A, 1020A, 1022A, and 1024A can be provided on any electronic devices in communications system 100 including but not limited to servers, computers, smartphones, tablets, smart devices, appliances, cameras, security devices, vehicles, user devices, and other digital platforms. In some embodiments, applications 1056A, 1058A, 1020A, 1022A, and 1024A can be executed on Windows, macOS, iOS, Android, or other operating systems or can be web-based and accessible through internet browsers. In some embodiments, applications 1056A, 1058A, 1020A, 1022A, and 1024A can be cross-platform with an ability to be executed on multiple OS environments. Applications 1056A, 1058A, 1020A, 1022A, and 1024A can be installed from various sources such as app stores, software repositories, or directly from ISP's website. In some embodiments, applications 1056A, 1058A, 1020A, 1022A, and 1024A are configured to communicate with BQUICK_TOP server 1005 via a virtual connection. In some embodiments, applications 1056A, 1058A, 1020A, 1022A, and 1024A are configured to communicate with BQUICK_TOP server 1005 via BQUICK ISP_A server 1012A. Applications 1056A, 1058A, 1020A, 1022A, and 1024A can be updated through app stores or via automatic updates depending on device settings.

BQUICK applications 1056A, 1058A, 1020A, 1022A, and 1024A are configured to facilitate integration and communication with other services or platforms, sharing of data, collaboration, and/or access to additional functionalities seamlessly. Applications 1056A, 1058A, 1020A, 1022A, and 1024A allow optical network unit 1020, television 1024 and user device 1022 to monitor latency, store subscription information (e.g., classic bandwidth in Megabits per second (MPPS), monitor low latency bandwidth (MBPS), max jitter in milliseconds), and provide options for upgrading internet service. The latency information and subscription information can be tracked according to device, device type, user identification, application, residence identification, etc. in some embodiments. The latency information can be provided in a packet with a time stamp to BQUICK_TOP server 1005 in some embodiments. A user interface can be provided by applications 1056A, 1058A, 1020A, 1022A, and 1024A on optical network unit 1020, television 1024 and user device 1022 to upgrade or downgrade to a different level of service in light of latency information. The different level of service can be provided to latency server 150 and BQUICK_TOP server 1005, BQUICK ISP_A BQUICK server 1012A, or BQUICK ISP_B BQUICK server 1012B in some embodiments.

System 100 advantageously includes an ISP infrastructure BQUICK application 156B for ISP infrastructure 106B, a head end BQUICK application 1058B associated with head end 1008B, a modem BQUICK application 1030B for modem 1030, and a set top box BQUICK application 1036B for set top box. Applications 156B, 1058B, 1030B, and 1036B are similar to applications 1056A, 1058A, 1020A, 1022A, and 1024A. In some embodiments, when applications 1030B, 1036B, 1056A, 156B, 1058B, 1058A, 1020A, 1022A, and 1024A are installed or associated devices join the network, the applications 1030B, 1036B, 1056A, 156B, 1058B, 1058A, 1020A, 1022A, and 1024A register at server 1012 as being compliant for operations described herein. User device 1032, television 1034, and game controller 1038 can also include an application similar to BQUICK applications 1022A and 1024A.

In some embodiments, BQUICK applications 1030B, 1036B, 1056A, 156B, 1058B, 1058A, 10201020A, 1022A, and 1024A are latency applications and are configured to communicate data so that a topology report can be provided. The topology report identifies devices/networks from end-to-end. Latency requirements of each device is provided in the report (e.g., on a device by device, type of usage by type of usage, user ID by user ID, or application by application basis) in some embodiments. The report can be stored at server 1012 in some embodiments. The latency requirements across the topology can be used to shape traffic, prioritize flow, etc. In some embodiments, the report tracks which devices are offline so that bandwidth reserved for those devices can be used for another device in some embodiments. In some embodiments, the report tracks whether the device is not running a low latency (e.g., BQUICK) application and yet is online so that bandwidth reserved for that device can be used for other devices in some embodiments. Offline refers to a state where a device, system, or application is not actively communicating with other devices or accessing online resources in some embodiments. A device that is off or asleep is offline in some embodiments. A low latency application can be offline when the low latency application is not running in some embodiments.

In some embodiments, the low latency packets are marked so that applications 1030B, and 1036B, 1056A, 156B, 1058B, 1058A, 1020A, 1022A, and 1024A can process the packets and flow as a low latency flow. In some embodiments, the end device (e.g., application 1024A) can send a command or request indicating that latency requirements are not being met and each application in the path (applications 1020A 1056A, and 1058A) can respond to that command to process the packets for that device at a higher priority or remove traffic from that path in some embodiments. Latency issues can be sourced from an AP, a mesh, a device, or a node. Tracking bit rates or latencies at each location allow solutions to be directed to the particular location of the latency issue.

Figure 1B:
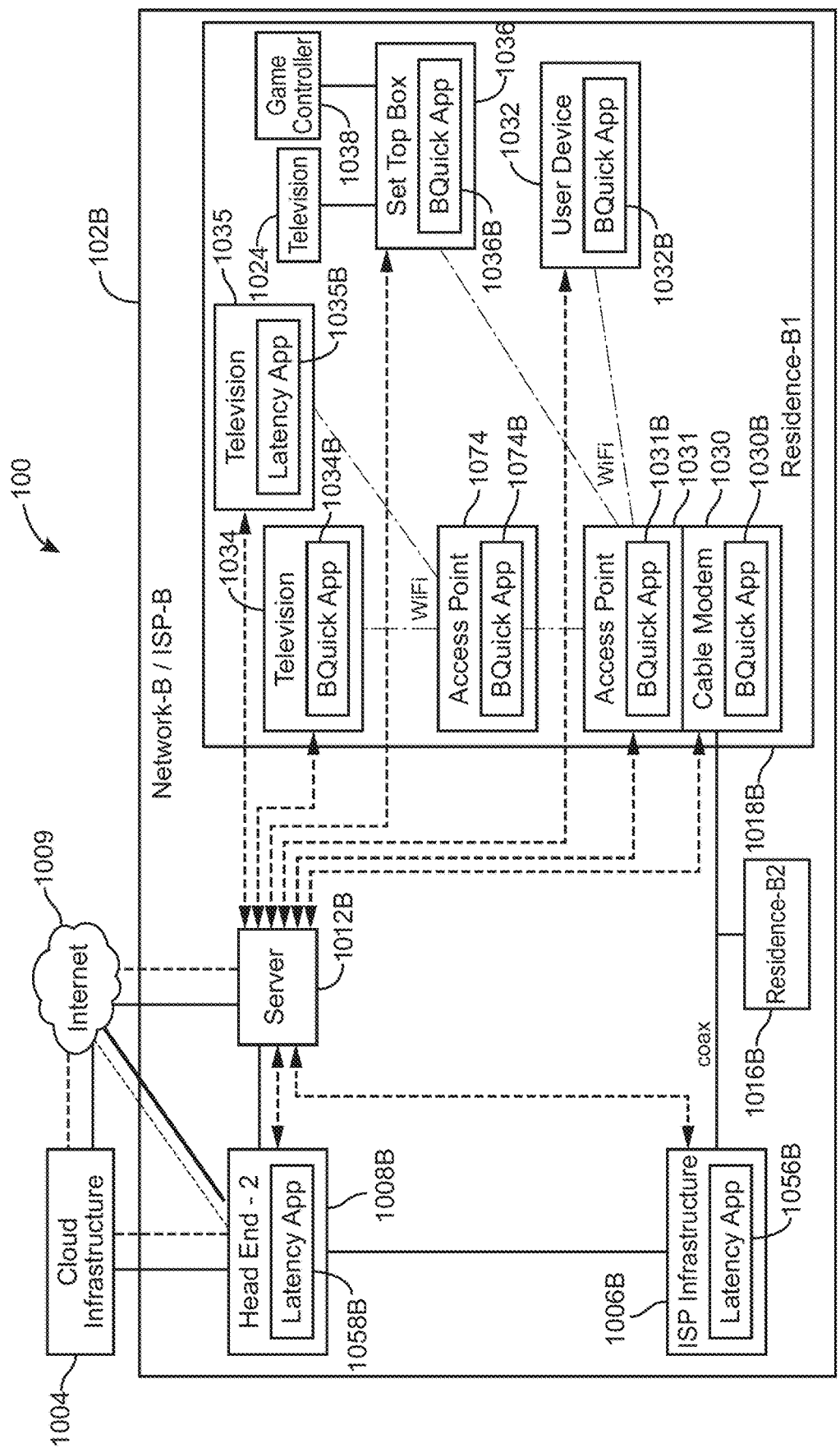
FIG. 1B is a general schematic block diagram of portion of the communication system illustrated in FIG. 1A according to some embodiments.

With reference to FIG. 1B, residence 1018B can include an access point 1031 in communication with modem 1030, a wireless router 1074 in communication with television 1034, a television 1035, set top box 1036, and user device 1032. Access point 1031 can be integrated with modem 1030 or can be a separate unit. User device 1032 includes a user device BQUICK application 1032B, and access point 1031 includes a latency access point application 1031B. Router 1074 includes a wireless router BQUICK application 1074B, television 1034 includes a television BQUICK application 1034B, and television 1035 includes a television BQUICK application 1035B. BQUICK_TOP server 1005, BQUICK_ISP_A server 1012A, and BQUICK_ISP_B server 1012B are in virtual communication with applications 1030B, 1031B, 1036B, 1074B 1032B, 1034B, 1035B, 156B, and 1058B in some embodiments. A server refers to any computing device that provides services or resources to other computers or clients within a network in some embodiments.

Applications 1030B, 1031B, 1036B, 1074B, 1032B, 1034B, 1035B, 156B, and 1058B are similar to applications 1056A, 1058A, 1020A, 1022A, and 1024A. Applications 1030B, 1031B, 1036B, 1074B, 1032B, 1034B, 1035B, 156B, and 1058B allow modem 1030, televisions 1034 and 1035, access point 1031, router 1074, set top box 1036, and user device 1032 as well as other cable modem termination systems to monitor latency, store subscription information (e.g., classic bandwidth in Megabits per second (MPPS), low latency bandwidth (MBPS), max jitter in milliseconds), and provide options for upgrading internet service. A user interface can be provided on optical network unit 1020, television 1024 and user device 1022 to upgrade or downgrade to a different level of service in light of latency information. This ability is available even if the devices are third party devices in some embodiments. In some embodiments, application 1031B or 1074B can be configured to update network topology information to BQUICK TOP server 1012, and applications 1030B, 1031B, 1036B, 1074B, 1032B, 1034B, 1035B, 156B, and 1058B can monitor low latency resources, request services, register devices, and request different latency treatment (e.g., for video, audio, commands, downloads, etc.). In some embodiments, devices or nodes associated with applications 1030B, 1031B, 1036B, 1074B 1032B, 1034B, 1035B, 156B, and 1058B can include algorithms for changing packet priority with time and latency requirements. Applications 1030B, 1031B, 1036B, 1074B, 1032B, 1034B, 1035B, 156B, and 1058B can communicate using virtual or logical connections (e.g., using internet 1009).

Access point 1031 is a networking device that allows Wi-Fi-enabled devices to connect to a wired network. Access point 1031 serves as a bridge between wireless devices, such as wireless router 1074, set top box 1036, user device 1032, televisions 1034 and 1035, and the wired network infrastructure, such as, modem 1030, routers, switches, and servers, in some embodiments. Wireless router 1074 can be a networking device that provides a wireless access point for a wireless network. Wireless router 1074 serves as a hub for a wireless local area network (LAN), allowing multiple devices in or around residence 1018B to connect to the internet and communicate with each other. Wireless router 1074 can include wirelessly built-in Ethernet switches which provide multiple ports for connecting wired devices. A wired connection can connect router 1074 to access point 1031 or modem 1030 in some embodiments. Wireless router refers to any device that provides a wireless access point for a wireless network in some embodiments.

Figure 1C:
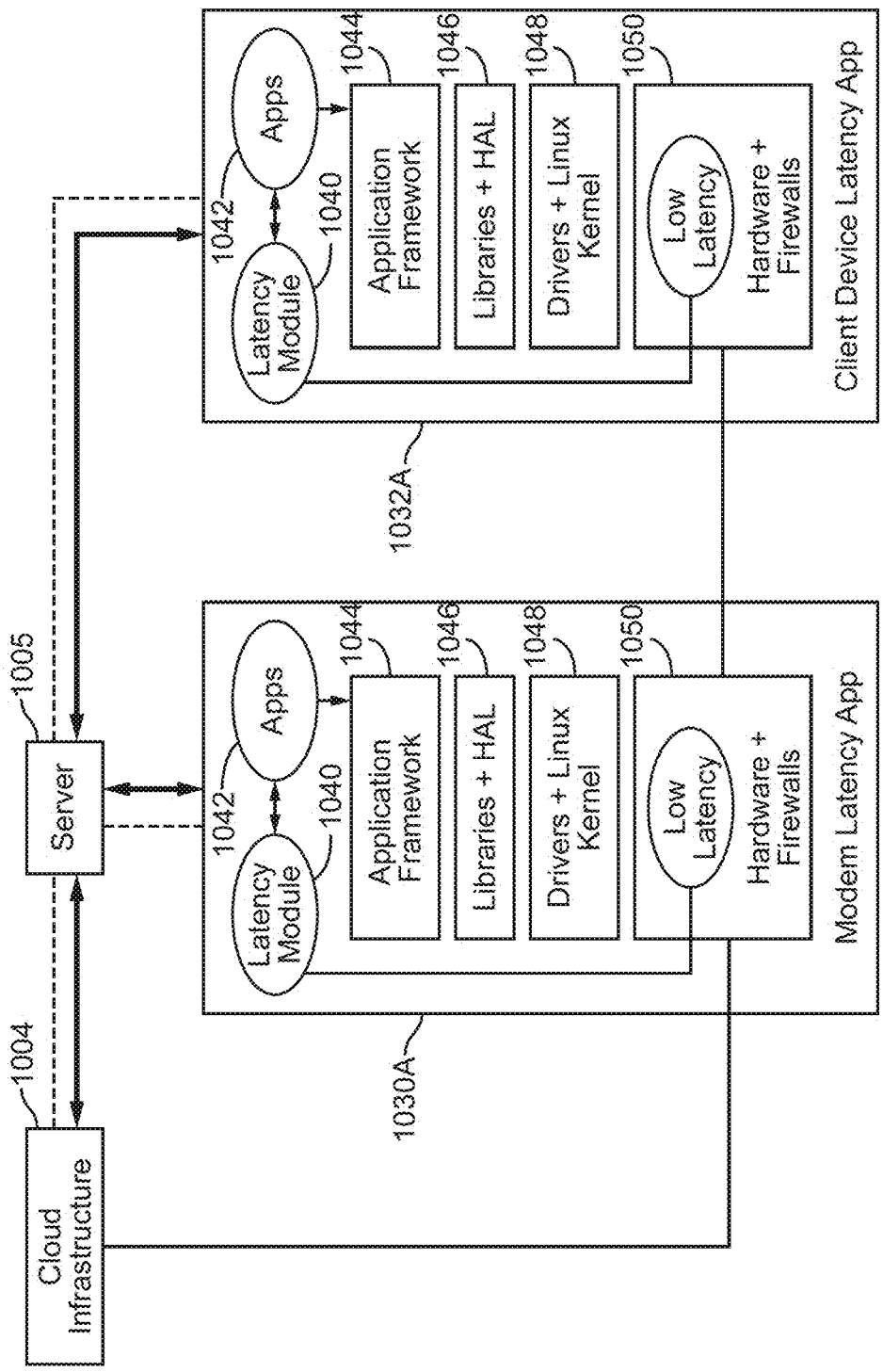
FIG. 1C is a general schematic block diagram of applications in communication with cloud infrastructure for the communication system illustrated in FIG. 1A according to some embodiments.

With reference to FIGS. 1B-1C, applications 1030B and 1032B are in communication with BQUICK_TOP server 1005 via a logical interface. The architecture of applications 1030B and 1032B can be used in any of applications 1031B, 1036B, 1074B 1034B, 1035B, 156B, 1058B, 1056A, 1058A, 1020A, 1022A, and 1024A. The logical interface is a virtual interface that represents a specific network configuration or functionality within a networking device, such as modem 1030 or user device 1032. The logical interface is software defined and can be created, configured, and managed within the device's operating system in some embodiments. Applications 1030B and 1032B can be provided with modems, routers, access points, mesh devices, set top boxes, AR/VR devices, game consoles, phones, over the top devices (OTTs), etc. Applications 1030B, 1032B, and cloud infrastructure 1004 can communicate using app to app communication. App to app communication is an exchange of data, messages, or commands between two or more software applications running on the same device or different devices over a network in some embodiments. App to app communication enables seamless integration and collaboration between different apps, allowing them to share information, trigger actions, or synchronize state without requiring user intervention in some embodiments. BQUICK_TOP server 1012 can include an application for monitoring and/or determining end to end latency.

In some embodiments, applications 1020A, 1024A, 1032B, 1034B, 1035B, 1036B, and 1032B are client level applications. Applications 1036B can be configured for highest priority (e.g., lowest latency applications) while ordinary streaming latencies are associated with applications 1020A, 1024A, 1032B, 1034B, 1035B, 1032B. Applications 137A and 1031B are node level application and can be configured to provide or assign priority for applications 1020A, 1024A, 1032B, 1034B, 1035B, 1036B, and 1032B (client level applications) and associated devices. Application 1030B can be configured to provide or assign priority between application 1036B, applications 137A and 1031B (e.g., node level applications), and applications 1020A, 1024A, 1032B, 1034B, 1035B, and 1032B (e.g., client level applications) as well as their associated devices. Cloud level applications can include applications 156B and 1058B in some embodiments. In some embodiments, the partitioning of applications 156B, 1058B, 1020A, 1024A, 1030B, 1032B, 1034B, 1035B, 1036B, 137A, and 1032B allows for segregation of local and cloud processing, reduction in cloud server communication and ISP bandwidth, local data storage and security, availability of local resources (including edge processing and filtering of information), and faster response to low latency devices. In some embodiments, application 1030B has a server extension and handles communication between server 1012 and applications 1020A, 1024A, 1032B, 1034B, 1035B, 1036B, and 1032B.

When application 1030B includes the server extension, application 1030B can be a client level application or a cloud level application and maintain a virtual connection to server 1012 in some embodiments. The server extensions can provide advantages of decoupling development from ISPs which can be helpful for standardization, of having a direct data path from application 1020A or 1031B to app developer servers, of maintaining local data privacy, of availability of local resources (e.g., local machine learning (ML), edge processing and filtering information), and of faster response to local low latency gadgets or devices in some embodiments.

In some embodiments, applications 156B, 1058B, 1020A, 1024A, 1030B, 1032B, 1034B, 1035B, 1036B, 137A, and 1032B can achieve synchronization of the wall clock across all nodes and end user devices. Applications 156B, 1058B, 1020A, 1024A, 1030B, 1032B, 1034B, 1035B, 1036B, 137A, and 1032B utilize timestamps for low-latency data packets at each node. This enhancement enables the determination of latency at each node and reporting to server 1012 in some embodiments. By utilizing a precision time protocol (PTP), applications 156B, 1058B, 1020A, 1024A, 1030B, 1032B, 1034B, 1035B, 1036B, 137A, and 1032B can distinguish whether latency arises from the home network, an ISP, or cloud servers using time stamps in some embodiments. Each device can have an associated PTP clock that communicates with the application associated with the device. The latency per node can be shared across networks so that networks can avoid devices having latency issues or can perform other operations to reduce latency at that node (e.g., divert higher latency traffic away from the node having issues). The PTP clock can be derived form a satellite clock in some embodiments.

With reference to FIG. 1C, applications 1030B and 1032B each include a latency module 1040, applications 1042, an application framework 1044, libraries and hardware abstraction layer 1046, drivers and linux kernel 1048, and hardware and firewalls 1050. In some embodiments, latency module 1040 is configured to control and monitor hardware and firewalls based upon latency. Latency module or BQUICK module 1040 is software configured to provide the low latency operations described herein. Applications 1042 are apps for performing various operations and can include third part apps (e.g., android package kit (APK)). Application framework 1044 is a structured set of software components that provide the necessary infrastructure for building and running applications.

Libraries and hardware abstraction layer 1046 provides standardized interfaces for device drivers to interact with hardware components. Libraries and hardware abstraction layer 1046 allows applications and system services to access hardware functionalities in a consistent manner across different devices. Libraries and hardware abstraction layer 1046 provide collections of pre-written code that developers can use to perform common tasks or implement specific functionalities and generally contain reusable functions, classes, or modules that provide specific capabilities.

Drivers and Linux kernel 1048 serves as the bridge between the hardware and the software layers of the system, managing system resources in some embodiments. Drivers and Linux kernel 1048 provide essential services and facilitate communication between software processes and hardware devices in some embodiments. Drivers and Linux kernel 1048 includes software components that facilitate communication between the operating system (OS) and hardware devices in some embodiments.

With reference to FIG. 1D, a function, service, process, or operation 1080 can controlled by any of applications 1030B, 1031B, 1036B, 1074B, 1032B, 1034B, 1035B, 156B, 1058B, 1056A, 1058A, 1020A, 1022A, and 1024A (FIGS. 1A and 1B). Operation 1080 use a classifier 1082, a low latency queue 1084, and a classic queue 1086. Queues 1084 and 1086 are memory or data structures used to manage the flow of packets or messages within a network device or system 100 (FIG. 1A). Queue 1084 is associated with a high-performance path, and queue 1086 is associated with a low performance path in some embodiments. A queue refers to any structure for storing information (e.g., packets) in some embodiments. Any networking device can have separate queue to support low latency traffic and operation can be performed any device in communication system 100 (FIG. 1A). Applications 1030B, 1031B, 1036B, 1074B, 1032B, 1034B, 1035B, 156B, 1058B, 1056A, 1058A, 1020A, 1022A, and 1024A can report latency for each queue independently.

Queues 1084 and 1086 are configured as first-in-first-out (FIFO) buffers that temporarily hold packets or messages before messages are transmitted or processed in some embodiments. Queue 1084 can store messages for the high-performance path (e.g., low latency path), and queue 1086 can store messages for the low performance path (e.g., high latency path) in some embodiments. In some embodiments, a low latency operations may use a low performance path, and a high latency operations may use the high performance path, or each uses the same path. A path refers to any communication route or channel through which data or information travels from a source to a destination (e.g., through devices and across mediums) in some embodiments. A path can include intermediate components and links involved in transmitting data between two or more points in one or more networks in some embodiments. A low latency path refers to a path for low latency traffic in some embodiments.

Classifier 1082 is processor and/or software configured to categorize or classify network traffic based on certain criteria (e.g., by latency requirements and/or priority). Classifier 1082 is configured to enforce network policies, prioritize traffic (e.g., for the high performance or low performance path), and/or apply specific actions based on the classification results in some embodiments. Classifier 1082 is used to differentiate between different classes of traffic (e.g., voice, video, data) and apply QoS policies to ensure that critical applications receive adequate bandwidth and latency requirements. Classifier 1082 prioritizes traffic based on predefined criteria, ensuring that important or time-sensitive applications receive preferential treatment over less critical traffic by appropriately providing traffic to queue 1084 and queue 1086. Classifier 1082 can utilize information about customer subscriptions (e.g., device level, user level, residence level) to classify traffic in some embodiments.

With reference to FIG. 1E, an operation 1088 can be controlled by any of applications 1030B, 1031B, 1036B, 1074B, 1032B, 1034B, 1035B, 156B, 1058B, 1056A, 1058A, 1020A, 1022A, and 1024A. Operation 1088 is similar to operation 1080 and utilizes a classifier 1090, a first low latency queue 1092, a second latency latency queue 1094, a classic queue 1096, and a priority queue 510. Queues 1092, 1094, 1096 and 1098 are memory or data structures used to manage the flow of packets or messages within a network device or system 100 (FIG. 1A). Queues 1092 and 1094 are associated with a high performance path, and queue 1096 is associated with a low performance path in some embodiments. Queue 1098 receives messages from queues 1092 and 1094 and provide messages or data to the high performance path based upon a priority scheme associated with queues 1092 and 1094 in some embodiments. Classifier 1090 is similar to classifier 1082 and is configured to categorize or classifying network traffic based on certain criteria (e.g., by latency requirements) for queues 1092, 1094, and 1096 in some embodiments. In some embodiments, classifiers 1082 and 1090 are software modules operating on a device (e.g., server, ISP supplied device, user device, etc.). In some embodiments, queues 1084, 1086, 1092, 1094, 1096 and 1098 are virtual queues provided on the memory of the device configured by operation 1080 or 1088. In some embodiments, queues 1084, 1086, 1092, 1094, 1096 and 1098 are dedicated hardware queues (e.g., FIFO memories) on the device. Classifiers 1090 and 1082 and queues 1084, 1086, 1092, 1094, 1096 and 1098 are implemented in an application layer of the device and may utilize services and structures provided by the media access layer and the physical layer in some embodiments. Classifiers 1082 and 1090 can be configured by commands provided by BQUICK TOP server 1012 to appropriately classify low latency traffic in some embodiments.

In some embodiments, applications 1080 and 1088 are configured to operate at nodes associated with devices including but not limited to ONU 1020, modem 1030, set top box 1036, television 1024, access point 1031, user device 1032, and/or router 1074. Applications 1080 and 1088 are configured to control and/or partition subscribed low latency bandwidth traffic (e.g., 20 Mbps vs 50 Mbps), track latency statistics (e.g., minimum, maximum, average latencies for low latency flows), process five tuples (e.g., source IP address, source port, destination IP address, destination port, transport protocol) for X number of flows (where X is any integer) with latency and/or bandwidth requirements, monitor latency introduced by a node, provide timestamps at ingress and egress ports, monitor buffer depths, perform boundary clock precision protocol (e.g., IEEE 10588-2008 standard and extensions thereof), and prioritize of traffic among multiple low latency clients. Monitored and measured information can be appended to packets for provision to other nodes and servers (e.g., server 1012). For example, time stamps can be applied to packets at each node or device. Latency can be determined by comparing time stamps. Applications 1080 and 1088 are also configured to track status of low latency applications and provide a user interface for controlling low latency configurations in some embodiments. Classifiers 1082 and 1090 and/or queues 1084, 1086, 1092, 1094, 1096 are configured by applications 1030B, 1031B, 1036B, 1074B, 1032B, 1034B, 1035B, 156B, 1058B, 1056A, 1058A, 1020A, 1022A, and 1024A (e.g., at each respective node) in some embodiments. In some embodiments, servers 1012, 1012A, and 1012B configure classifiers 1082 and 1090 and/or queues 1084, 1086, 1092, 1094, 1096 via virtual connections.

Applications 1080 and 1088 can identify end to end bandwidth available for low latency applications, provide a user real time feedback of monitored latency, and adjust latency responses. The adjustment may be in response to purchased services or bandwidth upgrades in some embodiments. In some embodiments, applications 1080 and 1088 can be configured to provide an advertisement or customer offer for low latency resources. Applications 1080 and 1088 can address variable latency for each user and adjust response for the latency level at a particular time, for a particular time period, etc. Latency information can be communicated to servers 1012A, 1012B, and 1012 and applications 1030B, 1031B, 1036B, 1074B, 1032B, 1034B, 1035B, 156B, 1058B, 1056A, 1058A, 1020A, 1022A, and 1024A as timestamps appended to packets as described herein, or to a packet identifier (e.g. 5 tuples and sequence number) in some embodiments. The time stamp information can be sent to servers 1012A, 1012B, and/or 1012 via an independent virtual/logical channel in some embodiments.

Figure 1F:
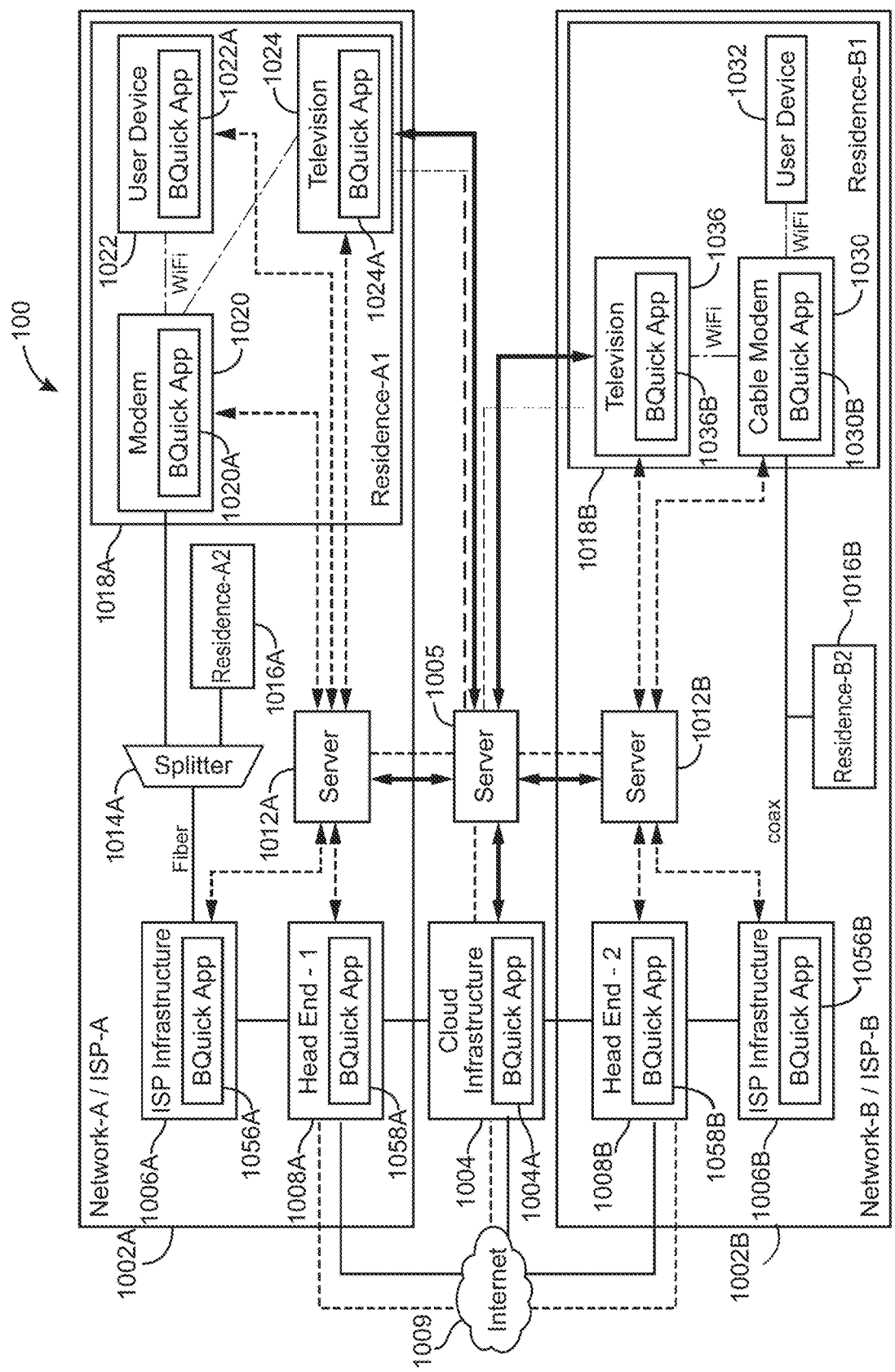
FIG. 1F is a schematic block diagram of the communication system illustrated in FIG. 1A including a server configured for augmented reality/virtual reality and/or metaverse applications according to some embodiments.

With reference to FIG. 1F, cloud infrastructure 1004 can include an application 1004A. Application 1004A is similar to applications 1030B, 1031B, 1036B, 1074B 1032B, 1034B, 1035B, 156B, and 1058B. BQUICK TOP server 1012 can be configured to monitor AR/VR applications and/or metaverse applications. An application executed on BQUICK TOP server 1012 can perform the monitoring functions. Application 1004A is in communication with BQUICK TOP server 1012. Servers 1012A and 1012B can include an application similar to application 1004A.

Using applications, 1020A, 1024A, 1030B, 1032B, 1034B, 1035B, 1036B, 137A, and 1032B, the devices given by ISPs, customer-owned AR/VR setups, mobile phones, over the top (OTT) devices, and cloud gaming clients are capable of facilitating low latency uses. Applications, 1020A, 1024A, 1030B, 1032B, 1034B, 1035B, 1036B, 137A, and 1032B allow devices in residences 1018A and 1018B to interact with the server extension integrated in the ONU 1020 and modems 1030 or routers (e.g., ISP provided). Additionally, the server extensions have the ability to filter and transmit all necessary information to servers 1012A and 1012B or share open data with application developers.

C. Computing Environment

Prior to discussing the specifics of embodiments of the systems and methods of the present solution, it may be helpful to discuss the computing environments in which such embodiments may be deployed.

Figure 2A:
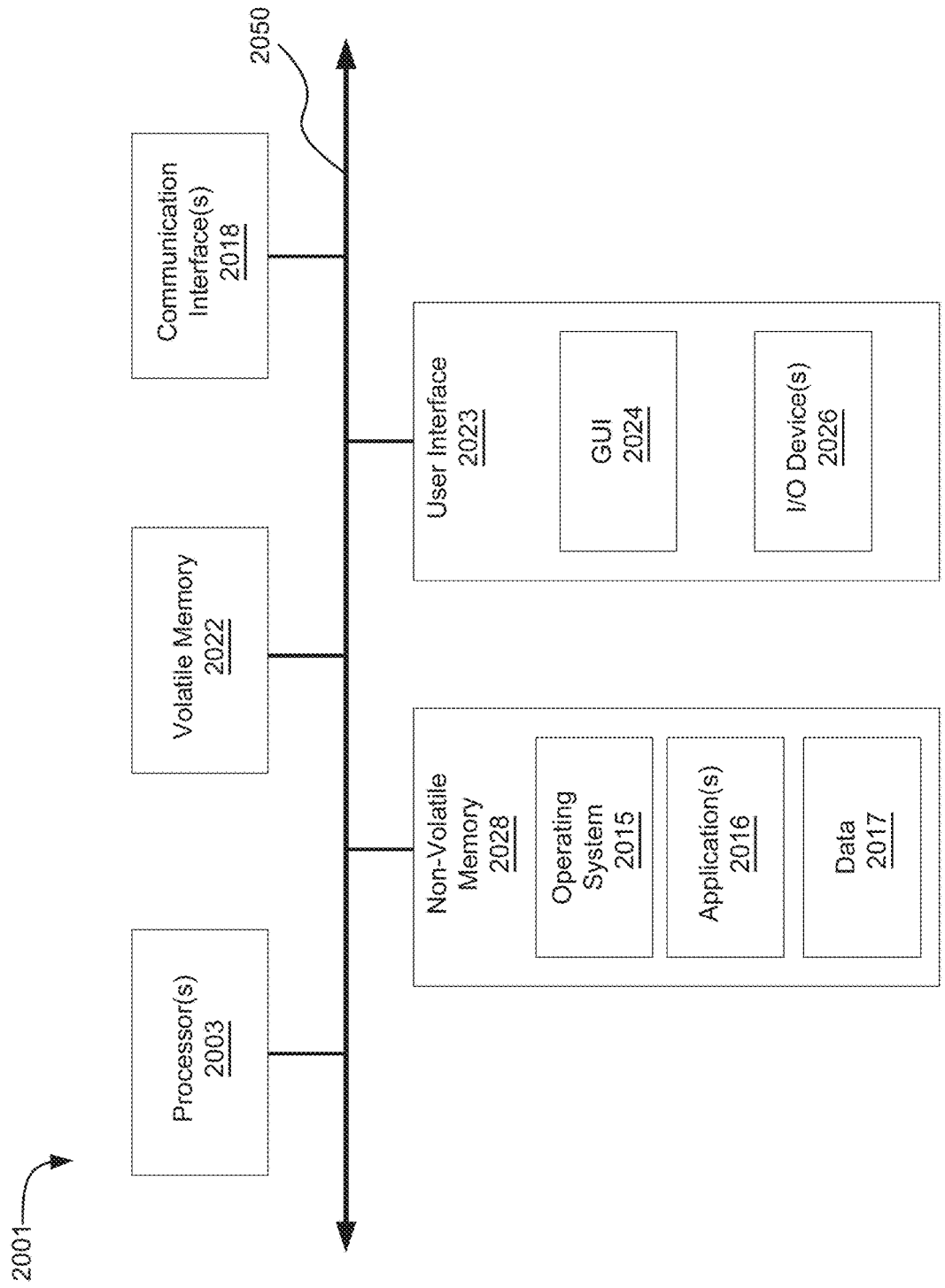
FIG. 2A is a block diagram of embodiments of a computing device.

As shown in FIG. 2A, computer 2001 may include one or more processors 2003, volatile memory 2022 (e.g., random access memory (RAM)), non-volatile memory 2028 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 2023, one or more communications interfaces 2018, and communication bus 2050. User interface 2023 may include graphical user interface (GUI) 2024 (e.g., a touchscreen, a display, etc.) and one or more input/output (I/O) devices 2026 (e.g., a mouse, a keyboard, a microphone, one or more speakers, one or more cameras, one or more biometric scanners, one or more environmental sensors, one or more accelerometers, etc.). Non-volatile memory 2028 stores operating system 2015, one or more applications 2016, and data 2017 such that, for example, computer instructions of operating system 2015 and/or applications 2016 are executed by processor(s) 2003 out of volatile memory 2022. In some embodiments, volatile memory 2022 may include one or more types of RAM and/or a cache memory that may offer a faster response time than a main memory. Data may be entered using an input device of GUI 2024 or received from I/O device(s) 2026. Various elements of computer 2001 may communicate via one or more communication buses, shown as communication bus 2050.

Computer 2001 as shown in FIG. 2A is shown merely as an example, as clients, servers, intermediary and other networking devices and may be implemented by any computing or processing environment and with any type of machine or set of machines that may have suitable hardware and/or software capable of operating as described herein. Processor(s) 2003 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 2018 may include one or more interfaces to enable computer 2001 to access a computer network such as a Local Area Network (LAN), a Wide Area Network (WAN), a Personal Area Network (PAN), or the Internet through a variety of wired and/or wireless or cellular connections.

In some implementations, the computing device 2001 may execute an application on behalf of a user of a client computing device. For example, the computing device 2001 may execute a virtual machine, which provides an execution session within which applications execute on behalf of a user or a client computing device, such as a hosted desktop session. The computing device 2001 may also execute a terminal services session to provide a hosted desktop environment. The computing device 2001 may provide access to a computing environment including one or more of: one or more applications, one or more desktop applications, and one or more desktop sessions in which one or more applications may execute.

Figure 2B:
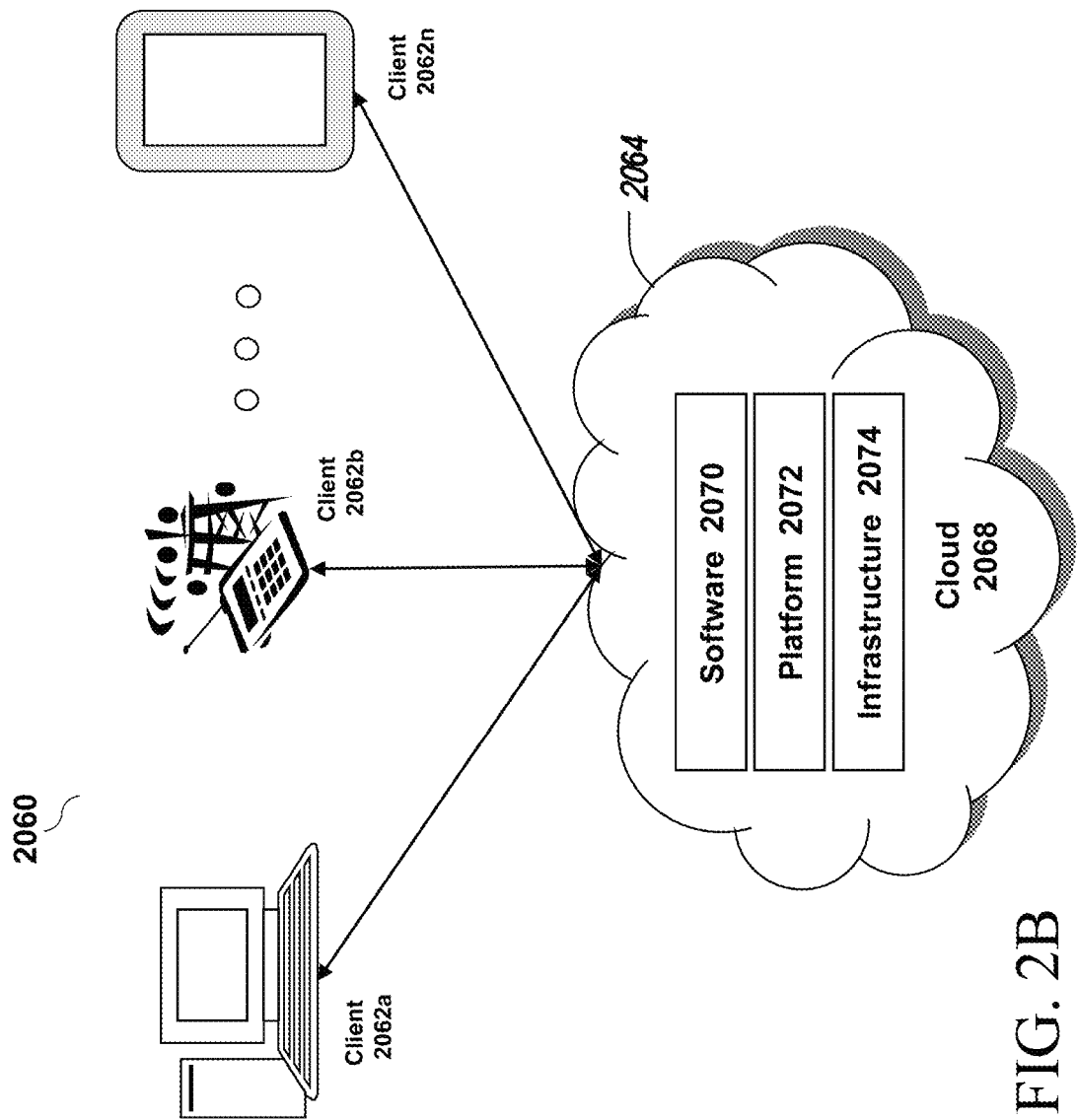
FIG. 2B is a block diagram depicting a computing environment comprising client device in communication with cloud service providers.

Referring to FIG. 2B, a computing environment 2060 is depicted. Computing environment 2060 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 2060 can provide the delivery of shared services (e.g., computer services) and shared resources (e.g., computer resources) to multiple users. For example, the computing environment 2060 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 2060 may provide client 2062 with one or more resources provided by a network environment. The computing environment 2062 may include one or more clients 2062a-2062n, in communication with a cloud 2068 over one or more networks 2064. Clients 2062 may include, e.g., thick clients, thin clients, and zero clients. The cloud 108 may include back-end platforms, e.g., servers 106, storage, server farms or data centers. The clients 2062 can be the same as or substantially similar to computer 2001 of FIG. 2A.

The users or clients 2062 can correspond to a single organization or multiple organizations. For example, the computing environment 2060 can include a private cloud serving a single organization (e.g., enterprise cloud). The computing environment 2060 can include a community cloud or public cloud serving multiple organizations. In embodiments, the computing environment 2060 can include a hybrid cloud that is a combination of a public cloud and a private cloud. For example, the cloud 108 may be public, private, or hybrid. Public clouds 108 may include public servers that are maintained by third parties to the clients 2062 or the owners of the clients 2062. The servers may be located off-site in remote geographical locations as disclosed above or otherwise. Public clouds 2068 may be connected to the servers over a public network 2064. Private clouds 2068 may include private servers that are physically maintained by clients 2062 or owners of clients 2062. Private clouds 2068 may be connected to the servers over a private network 2064. Hybrid clouds 2068 may include both the private and public networks 2064 and servers.

The cloud 2068 may include back-end platforms, e.g., servers, storage, server farms or data centers. For example, the cloud 2068 can include or correspond to a server or system remote from one or more clients 2062 to provide third party control over a pool of shared services and resources. The computing environment 2060 can provide resource pooling to serve multiple users via clients 2062 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 2060 can provide on-demand self-service to unilaterally provision computing capabilities (e.g., server time, network storage) across a network for multiple clients 2062. The computing environment 2060 can provide an elasticity to dynamically scale out or scale in responsive to different demands from one or more clients 2062. In some embodiments, the computing environment 2060 can include or provide monitoring services to monitor, control and/or generate reports corresponding to the provided shared services and resources.

In some embodiments, the computing environment 2060 can include and provide different types of cloud computing services. For example, the computing environment 2060 can include Infrastructure as a service (IaaS). The computing environment 2060 can include Platform as a service (PaaS). The computing environment 2060 can include serverless computing. The computing environment 2060 can include Software as a service (SaaS). For example, the cloud 2068 may also include a cloud-based delivery, e.g., Software as a Service (SaaS) 2070, Platform as a Service (PaaS) 2072, and Infrastructure as a Service (IaaS) 2074. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by Right Scale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g., DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 2062 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 2062 may access PaaS resources with different PaaS interfaces. Some PaaS interfaces use HTTP packages, standard Java APIs, Java Mail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 2062 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 2062 may also access SaaS resources through smartphone or tablet applications, including, e.g., Salesforce Sales Cloud, or Google Drive app. Clients 2062 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Although examples of communications systems described above may include devices operating according to an Ethernet and other standards, it should be understood that embodiments of the systems and methods described can operate according to alternative standards and use wireless communications devices other than devices configured as devices. For example, multiple-unit communication interfaces associated with cellular networks, satellite communications, vehicle communication networks, wired networks, and networks can utilize the systems and methods described herein without departing from the scope of the systems and methods described herein.

D. Queue Management for Latency Control

Disclosed herein are systems and methods of queue management for latency control. The systems disclosed herein can include a latency controller. The latency controller can receive data packets from any of various sources, which may further be associated with various applications, such as streaming audio and video which are latency sensitive, and other applications, such as file downloads or email messaging, which are not latency sensitive (or are less latency sensitive, associated with larger latency budgets). The latency controller can generate, receive, or otherwise associate an arrival time stamp with each received packet. The latency controller can determine a classification for each packet, such as according to an application type (e.g., a correspondence to a streaming video application or streaming audio application).

The latency controller can determine a queue associated with the packet classification. For example, video data or audio data can be associated with multiple priority queues. Other data can be associated with a lower priority queue, in some embodiments. The latency controller can determine a departure time stamp for one or more packets (e.g., at least for the packets associated with the higher priority queues). The latency controller can communicate the packets with a selected queue based on the application type. For example, the selected queue can correspond to a latency budget, the latency budget corresponding to an offset between the arrival time stamp and the departure time stamp. A transmission scheduler of or associated with the latency controller can cause a transmission of the packets from any of the queues based on the departure time stamp.

For clarity of the disclosure, before proceeding with further description of the systems and methods provided herein, illustrative descriptions of various terms are provided:

A latency controller may refer to one or more devices, or an application, software, agent, service, process, task or other forms of executable instructions executing on the one or more devices, to manage queues according to a classification of an associated application, according to some embodiments. The latency controller can execute any of the operations disclosed herein, according to various embodiments. For example, the latency controller can include any combination of analog or digital circuitry or software, application, process, service, task, script or otherwise any type of executable instructions for one or more processors. In some embodiments, the latency controller can include a processor configured to execute instructions stored on a non-transitive computer readable media, or such instructions.

A packet may refer to or include a unit of data according to an organizational structure for network communication, according to some embodiments. In some embodiments, the packet can include a data element structured according to a third layer of an Open Systems Interconnection (OSI) model, however, such an example is not limiting. For example, a data structure defined according to a second layer of an OSI model (sometimes referred to as a frame), a datagram, or other unit of data according to an organizational structure for network communication may also be referred to as a packet. The packet can be organized to include a payload and header data, the header data including tuple information such as an indicator of a source, a destination, or a protocol. In some embodiments, the payload or header data can include indicia of an application type.

A flow, such as data flow or flow of data packets, may refer to or include movement or communication of data, such as packets, through a computing environment, systems and/or network(s). A flow may traverse a data path between a source and a destination, according to some embodiments. For example, the flow can traverse one or more network element, network device, or computing element. In some embodiments, the flow can traverse two or more networks or multiple connections between a source device and a destination device. In some embodiments, the flow can include communication of data between end points on same device. A flow may comprise a communication of packets between end points or devices for an application, such as a low latency application. A flow may comprise the communication of packets over a transport layer connection, such as TCP or UDP, between one endpoint identified by an Internet Protocol (IP) address and port and another endpoint identified by another IP address and port. A flow may comprise one or more streams of data or data streams.

A channel can refer to a communication channel or medium used to transport or communicate data. A channel may be a portion or segment of a connection, flow or data path, in some embodiments. A channel may comprise a logical or software construct for communicating data, such as queues, packets, between end points, devices or entities and any logic managing the foregoing. A channel may use one or more queues or buffers for data or packets to be transmitted or received. A channel may be implemented or supported by any network or computing device described herein. A channel may include, be used by or integrated with any receiver, transmitter and/or transceiver. A channel may use, be part of or integrated with any type and form of connections, such as transport layer connections for a flow of packets for an application between a client and server. Aspects of a channel can include a physical or logical medium. For example, a higher priority channel and lower priority channel can traverse shared or separate physical media. In some embodiments, logical channels can include a temporal aspect. For example, a high priority channel can extend over a same physical media, and include same source or destination addresses, but a higher priority channel can precede the lower priority channel.

Some channels can be referred to as, assigned, or otherwise associated with a priority level. A higher priority channel may refer to or include a channel having a priority level which exceeds another channel, in some embodiments. The higher priority level may refer to or include a priority level associated with a lesser latency than a lower priority channel. A lower priority may refer to or include a priority level for a channel which is lower than another channel. A highest priority channel may refer to or include a channel having a priority level which exceeds all alternative channels, in some embodiments. A lowers priority channel may refer to or include a channel having a priority level which is exceeded by all alternative channels, in some embodiments.

An arrival time stamp (ATS) may refer to or include a temporal indication of an arrival time of a packet at a source, such as a device, network interface or queue, in some embodiments. For example, the ATS can include an absolute time or relative offset with regard to an arrival of other packets. The arrival time stamp may be referred to as an ingress time stamp, in some embodiments. A departure time stamp (DTS) may refer to or include a temporal indication of a transmission time of a packet from a queue, network interface or device, or a receipt at a destination device, in some embodiments. For example, the DTS can include an absolute time or relative offset with regard to an arrival of other packets. The departure time stamp may be referred to as an egress time stamp, in some embodiments.

A passage of a time stamp (e.g., a determination that the time stamp has passed) can refer to or include a comparison between a current time with a time of the time stamp, such as an ATS or DTS of a packet, in some embodiments. For example, a passage of the time stamp can include a comparison of an absolute time to a current time, or a comparison of a predetermined offset to a current state of the offset.

A queue may refer to or include a storage location, such as in memory, for storing packets or other data elements to be transmitted or received. A queue may include a sequence or order of packets or data elements for transmission, according to some embodiments. For example, the queue may refer to or include a memory element storing the data elements, or a logical organization of such data elements in memory. The queue may use one or more memory elements, buffers or data structures for storing, managing, arranging or organizing packets that are received or to be transmitted.

A latency budget may refer to or include an amount of time allocated to or associated with one or more queues or with one or more transmissions of a plurality of packets or for transmission of packets for one or more flows. The latency budget may refer to a amount of time or amount of latency allowed to maintain latency for a flow of packets or an application, in some embodiments. The latency budget may refer to an amount of time or amount of latency an application may tolerate, which can refer to a performance of an application such as a delay in video or audio data which may be perceptible to a user, or another defined time. The amount of latency for a budget may identify a threshold of time for which a packet is to be transmitted for a flow of packets of an application. A latency budget may be the amount of time for packets to be queued before transmission. In some embodiments, the latency budget may correspond to a transmission time by which a number of one or more packets in queues are to be transmitted. In some embodiments, the latency budget may be a temporal offset or difference between a first and second event or first and second time. For example, the temporal offset can extend between the arrival of a packet and a transmission of the packet (e.g., a transmission of the packet by a transceiver, or a processing of the packet by a controller).

A type of application may refer to or include a category or classification of a function, protocol, service, content, or other resource accessible to a computing device, according to some embodiments. A type of application can be identified according to a port or address (e.g., IP address or MAC address) of a source or destination, protocol, statistics of the IP traffic (e.g., IP packet count, inter-packet interval, packet size, etc.) generated by the application, or other information conveyed between the source and destination (e.g., a four-tuple or a five-tuple). In some embodiments, a type of application can be identified according to the statistics of the IP traffic generated by the application (e.g., IP packet count, inter-packet interval, packet size, etc.). For example, a type of application can correspond to audio, video, text, data or any combination. Audio may refer to or include voice data, music streaming, real-time audio communication, or any sound-related transmitted content, in some embodiments. This can include VoIP (Voice over Internet Protocol) calls, online music streaming services, audio in video conferences, and any other form of digital audio content being sent or received over a network. Video may refer to or include visual data, movie streaming, real-time video communication, or any image-related transmitted content. This can include VoIP (Voice over Internet Protocol) calls with video, online movie streaming services, video in video conferences, and any other form of digital video content being sent or received. A type of application may identify whether the application is a low latency application and/or type of low latency application.

A transmission scheduler may refer to or include executable instructions of a device or device configured to schedule transmission of data, such as packets from one device to another device. The transmission scheduler can comprise any type of software, application, process, service, task, script or otherwise any type of instructions executable by one or more processors, or circuits. The transmission scheduler may identify, determine and/or schedule a time for data (e.g., packets) to be transmitted from a device. The transmission scheduler may identify, determine, or schedule an order of data or packets to be transmitted from a device. The transmission scheduler may identify, determine and/or schedule a priority of data or packets to be transmitted from a device. The transmission scheduler may identify and determine a channel or queue for data or packets to be stored and/or transmitted from a device, such as based on level of priority determined via a classifier. The transmission scheduler may be in communication with a processor, queue, transmitter or transceiver such as to provide scheduling information, including timing, ordering, re-ordering, or priority to a processor for processing, a transceiver for transmission, or so forth.

The transmission scheduler may access any one or more queues, such as transmission queues, to identify priority, order, or schedule of packets for transmission. The transmission scheduler may perform a reordering (also referred to as a resequencing, without limiting effect) which may refer to or include changing a relative order of the sequence of various packets, for transmission, in some embodiments. For example, the reordering may be accomplished via changing a storage location of a packet in a memory device, or changing a pointer or other reference to the packet. The transmission scheduler may change schedule information in one or more transmission schedules to reorder packets without changing the pointers to where packets are stored in a transmission queue, in some embodiments.

An access point (AP) may refer to a device for communicatively coupling one or more "non-AP" devices (e.g., a client device/STA) to a network in some embodiments. More specifically, an AP may enable non-AP devices to connect and communicate with a network. In some embodiments an AP may be a "wireless access point" (WAP) configured to enable wireless communication between non-AP devices. An AP includes but is not limited to a mobile, portable, or fixed hot spot, router, bridge, or other communication device.

A modulator-demodulator (modem) may refer to or include a communication device that converts digital data generated by a computer or other digital device into an analog signal suitable for transmission over analog communication lines, such as telephone lines or cable networks, and vice versa, in some embodiments. Modems can include standalone devices or integrated into other devices, such as routers or computers, and can be used to connect digital devices to the Internet through telephone lines, cable systems, or satellite links. A cable modem may refer to or include a modem to communicate over a cable network including coaxial cable (e.g., a Hybrid Fiber-Coaxial (HFC) network). A cable modem can be in communication with a cable modem termination service (CMTS). A CMTS may refer to or include a provider gateway to communicate with various cable modems over a network (e.g., the HFC network), in some embodiments. For example, the CMTS can provide internet or digital television traffic to various devices of home or business networks.

A transmission mode may refer to or include a method or manner in which packets or data are transmitted from one point to another over a communication channel, connection or flow, in some embodiments. It encompasses various aspects of the communication process, including the direction of the flow of information (simplex, duplex, half-duplex), the scheduling and/or timing of packet or data transmission, the speed of packet or data transmission, amount of packets or data being transmitted, and the method by which the packets or data are sent. A pacing mode may refer to or include a transmission control mechanism where the flow of data packets is regulated according to a predefined rate or within a rate threshold or rate range such as, for example, in response to the receiving an end-device capacity to process incoming data, in some embodiments. A pacing mode can prevent congestion and ensure smooth data flow by matching the transmission rate to the receiver's processing speed or to the available bandwidth. A bursting mode may refer to or include a transmission control mechanism where the flow of data packets is regulated according to intermittent provision of multiple data packets as quickly as device can or in a batch mode, followed by intervals of non-burst transmission as lower transmission activity or the mode of transmission used before bursting or scheduled to be used after the bursting activity, in some embodiments. A bursting mode may increase the use of available network bandwidth, accommodating high-volume data transfers in short bursts to enhance overall data throughput and efficiency.

Latency sensitive information can refer to or include information which, if delayed, can impact a functionality of a client device as perceptible to a user. For example, latency sensitive information can include video or audio data of a stream, control data associated with a time-out, or so forth. Latency sensitive applications can include low latency applications such as the infrastructure latency applications 1056 A-B, client level applications 1020A, 1024A, 1032A, 1034A, 1035A, 1036A, and 1032A, modem latency applications 1020A, 1030 or an application 1022A for the user device 1022.

Figure 3:
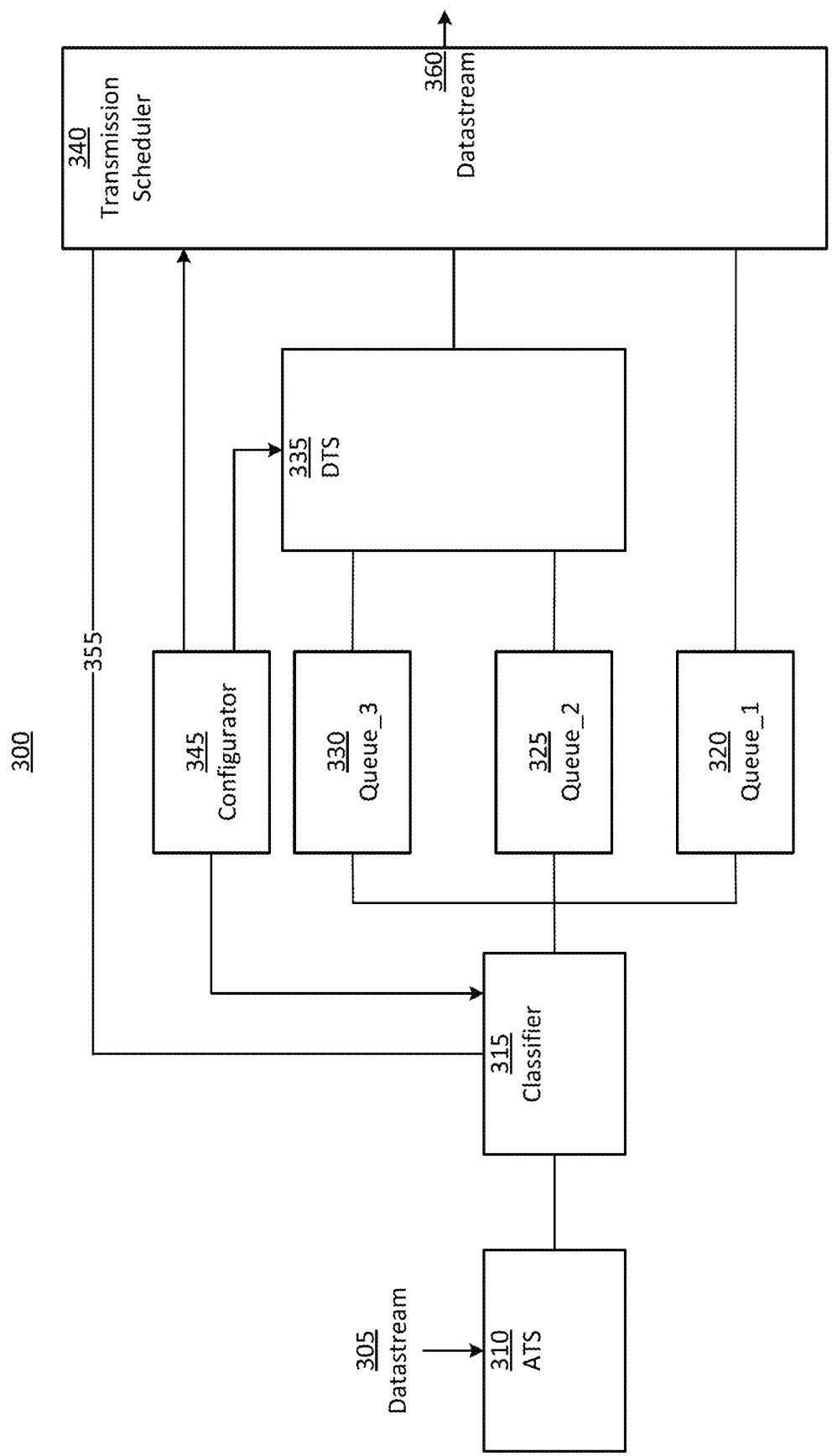
FIG. 3 is a system diagram for a latency controller configured to sequence packets according to a classification thereof, according to some embodiments.

With reference to FIG. 3, a diagram of a latency controller 300 is depicted. The latency controller 300 may be configured to identify time stamps of packets of data flows, perform classification of packets and associated applications, prioritize packets and schedule packets for transmission according to priority and classification. The latency controller 300 is configured to receive packets for a flow of packets, such as a data stream 305 providing a plurality of packets of various flows. An arrival time stamper 310 can identify, determine and/or associate an arrival time stamp with packets of the data stream 305. The classifier 315 can classify the packets according to a type of application associated with the packet or flow. For example, the classifier 315 can classify packets or flows as corresponding to a low latency application.

The classifier 315 can classify packets (to include flows thereof) according to the types of applications (or latencies associated therewith), and assign or otherwise associate channels with the packets. For example, each channel may be associated with a different latency budget or other or performance metric, such that an assignment of a channel can correspond to a latency accrued prior to a transmission of the packet. Some packets can include latency sensitive information as identified by the classifier 315. The priority determined by the classifier can correspond to a latency budget for the latency sensitive information.

The latency controller 300 can be implemented on or include an access point, a cable modem, a cable modem termination system, or another network device (e.g., an optical line terminal (OLT), optical network unit (OLU), digital subscriber line (DSL), or digital subscriber line access multiplexor (DSLAM)). In some embodiments, the latency controller 300 can include a latency server (e.g., BQUICK_TOP server 1005). In some embodiments, the latency controller 300 includes a latency application of the various networked devices discussed herein. For example, the latency controller 300 can include any of latency application 1056A, latency application 1058A, latency application 1020A, latency application 1022A, or latency application 1024A. The latency controller 300 can be in communication with a latency server (e.g., BQUICK_TOP server 1005) to receive information, data, instructions or configuration on the operation of the latency controller 300. For example, the latency controller 300 can receive a latency budget for an application type, indicia of an application or application type identity (e.g., port number, address, or header data) from the latency server (e.g., BQUICK_TOP server 1005). The latency controller 300 can determine an application type or latency budget based on the information received from the latency server (e.g., BQUICK_TOP server 1005), such as by determining that an application associated with a packet is a low latency application.

The latency controller 300 includes or is in communication with a first queue 320, a second queue 325, and a third queue 330. The queues can vary in priority relative to each other, such as to implement the latency budget. For example, the first queue 320 may be referred to as a standard (or low) priority queue, and may be described as a lower priority queue than the second queue 325 or the third queue 330. The second queue 325 and the third queue 330 may be referred to as high or higher priority queues (e.g., relative to the first queue 320), and may further vary in relative priority. For example, the third queue 330 may be a highest priority queue, such that the third queue 330 is higher priority than the second queue 325 and the second queue 325 is lower priority than the third queue 330. The priorities of the queues are based on associated classification of packets or flows. Particularly, high priority queues may be associated with low latency applications. For example, a transmission scheduler can preferentially service higher priority queues over lower priority queues, which may reduce a time that packets stored in the higher priority queues remain at rest.

Each queue 320, 325, 330 may correspond to at least one channel, the channel corresponding to an application or application type. For example, one or more first channels for packets of low priority or unclassified application data can correspond to the first queue 320, one or more second channels for packets of application data associated with a higher priority that the first channel can correspond to the second queue 325, and one or more third channels for packets of application data associated with a higher priority that the second channel can correspond to the third queue 330. Additional or fewer channels can be employed in various embodiments, which may be associated with at least one queue. In some embodiments, a highest priority may be prioritized with a separate channel, and may advance along a side channel link 355. In some embodiments, unclassified data may correspond to a higher priority queue, such as according to a precautionary prioritization schema.

The various flows can share a queue, medium, processor, or other resource. The latency controller 300 can sequence packets of the various flows. For example, the departure time stamper (DTS) 335 can generate a departure timestamp to indicate a packet priority for a medium, processing operation, or so forth. The departure time stamp can indicate a latency time from the arrival time stamp (e.g., the arrival time stamp and the latency time may sum to form the departure time stamp). The transmission scheduler 340 can schedule the packets according to the departure timestamp. In this way, the transmission scheduler 340 can process, transmit, or otherwise interface with the packets according to an arrival time and a latency budget, where the latency budget corresponds to an application type associated with a priority.

Referring again to the data stream 305, the flows of data can correspond to a plurality of different applications, some of which may be low latency application and others non-low latency applications. The flows may have different source and destination end points (e.g., IP addresses) and port numbers. Some of the flows may be between the same source and destination devices, such as where the respective devices exchange low latency packets such as streaming video or audio as well as other data such as emails, or file transfers.

The data stream 305 may refer to either of a stream of data as received by the ATS 310, as depicted, or another portion of the latency controller 300. For example, in some embodiments, the input to the classifier 315 from the ATS 310 may be referred to as the data stream 305. In some embodiments, the ATS 310 (or other depicted components, such as the transmission scheduler 340) may be referred to as separate from the latency controller 300. For example, the latency controller 300 can receive a data stream 305 including the arrival time stamps generated by the ATS 310. In some embodiments, the classifier 315 may be the classifier 1082, 1090 of the applications 1080, 1088 of FIG. 1D or 1E. A data stream 360 at the output of the transmission scheduler can include re-ordered packets relative to other portions of the data stream, such as at the data stream 305 at an input to the latency controller 300.

The flows may be received according to any number of physical media, physical connection, or logical relationship. The flows can be received at an input comprising any type of software, application, process, service, task, script or otherwise any type of executable instructions for one or more processors. In some embodiments, the input may include any type and form of circuitry. For example, the input can include one or more communications interfaces. The communications interfaces can include network interfaces to couple with devices across a network, a local interconnect such as an AXI or PCIe bus, or a logical data source such as a memory mapped address. The flow can be received by the device as the flow traverse the device as communicated between a sender and receiver, such as a server and a client.

The arrival time stamper (ATS) 310 can be a component of or otherwise associated with (e.g., communicatively coupled with) the latency controller 300. The ATS 310 can comprise any type of software, application, process, service, task, script or otherwise any type of instructions executable by one or more processors. In some embodiments, the input may include any type and form of circuitry. The ATS 310 can access an indication of time, and tag or otherwise label packets of the flows with an arrival time corresponding to an arrival at the latency controller 300. The indication of time can include a network time protocol (NTP) time, Unix time stamp, indication of Coordinated Universal Time (UTC), or other indication of time such as an elapsed time from system boot, a time indicated by a rollover timer, or other temporal indication. The ATS 310 can associate the arrival time stamp with each packet. In some embodiments, the ATS 310 can append an arrival time stamp (ATS) to a packet, wherein the packet including the arrival timestamp is provided to a departure time stamper (DTS) 335, transmission scheduler 340, or other depicted components. In some embodiments, the arrival time stamper 310 can convey or otherwise communicate a lookup table (LUT) or other association of the arrival time stamp with the DTS 335 or the transmission scheduler 340.

The latency controller 300 includes a classifier 315 to classify packets received from the flows according to a priority. The priority, in turn, may correspond to a latency budget or other performance metric. To determine the classification, the classifier 315 can implement various rules based on the packet or associated information, such as the header data, the content of a payload, arrival times, or other packet statistics (e.g., packet rate, packet size, etc.). For example, in a networked environment, the classifier 315 can classify a priority of a packet according to an application corresponding to a source or destination thereof, such as according to tuple information. Such information can include, for example, a 3-tuple including a source address (e.g., IP address), destination address (e.g., IP address), and protocol (e.g., TCP or UDP). A 4-tuple, including destination and source IP addressed and destination and source ports or 5-tuple including the protocol with destination and source IP addressed and destination and source ports.

The classifier 315 can comprise any type of software, application, process, service, task, script or otherwise any type of executable instructions for one or more processors. In some embodiments, the classifier 315 includes any include type and form of circuitry. The classifier is configured to classify a packet according to a type of application, such as low latency application or non-low latency application. For example, the application can be one of video or audio (e.g., corresponding to the conveyance of video data or audio data). For example, the classifier 315 can classify the packet according to the tuple information (e.g., a predefined association between a port or other address or the protocol type and an application type). In some embodiments, the classifier 315 can classify the packet according to a flag or other header information, timing or other flow characteristics (e.g., burstiness or periodicity, flow duration, or the like). In some embodiments, the classifier 315 can perform payload inspection (e.g., deep packet inspection) to classify the packet.

The classifier 315 can route, direct or forward packets, based on their classification, to a particular queue of the latency controller 300. For example, the classifier 315 can be disposed in a data flow for the packets to route the packets, or can otherwise associate packets with a classification (e.g., appending or otherwise tagging a classification, including the classification data in a look-up table (LUT), such as the LUT described with regard to the ATS 310, above).

In some embodiments, the classifier 315 can communicatively couple with the transmission scheduler 340 to exchange additional information incident to the transmission of a classified packet. For example, the classifier can include a side channel link 355 to cue the transmission scheduler with pacing or bursting of data, or with packets including an immediate send priority. For example, frame spacing information or information corresponding to an arrival time can be passed directly to the transmission scheduler to decrease latency. Such information can include flag settings, overflow information, tuple data, or payload data (e.g., packet inspection data). In some embodiments, classifier can communicate via side channel link 355 to provide such information or for handling of certain packets.

Referring again to the queues 320, 325, 330, each queue can include any type of software and/or hardware construct, such as in circuitry, to enqueue packets. For example, the queue may be a buffer in memory. The queues can be implemented according to a circular buffer, linear first in first out (FIFO) queue, or other implementation. For example, the queue can be implemented as a shift register, memory map, or other implementation. Each queue can include a finite memory space, and may be configured to convey an indication of a queue occupancy (e.g., empty, full, half full, overflow, underflow, etc.). For example, the queues can communicate the indication of occupancy to the classifier 315, the DTS 335, or the transmission scheduler 340. In some embodiments, the latency controller 300 is configured to re-order data as enqueued by one or more of the queues, such as the higher priority queues 325, 330. For example, the latency controller 300 can re-order packets based on a departure time stamp associated with the re-ordered packet, or with another packet. For example, the re-ordering can increase a margin of a latency budget, place like packets together (e.g., to generate data bursts to reduce context switching at a connected device) or pace packets (e.g., to allow for processing time at a connected device, or avoid overflow of a buffer at a connected device). Re-ordering of packets can be affected via a change to a packet location, a change to a pointer, or other implementation.

The queues may be implemented according to data structures, memory structures or memory components of a same device, or may be implemented on or across separate devices. For example, in some embodiments, the communicative coupling between one or more of the queues and the classifier 315, DTS 335, or transmission scheduler 340 can traverse network interface ports between network connected devices. In some embodiments, one or more of such links may be an internal connection of a same device.

One or more of the queues may be associated with a latency target, latency budget, or other performance metric. For example, the higher priority queues may be associated with a lower latency time of a latency budget than a lower priority queue. In some embodiments, one or more queues may not be associated with the, for example, latency budget. For example, the lowest priority queue can omit the latency budget.

The latency controller 300 includes a DTS 335. The DTS 335 can comprise any type of software, application, process, service, task, script or otherwise any type of executable instructions for one or more processors. The DTS 335 is configured to generate a departure time stamp for packets according to a latency budget (or other performance). The latency budget can correspond to the type of application, source, or other parameters. The DTS 335 can determine a destination time stamp based on the arrival time (e.g., the arrival time stamp) and a latency budget for the classified type of application. The DTS 335 can generate the departure time stamp by adjusting the arrival time stamp by a predefined offset (e.g., the latency time). The latency time can correspond to the type of application of the packet, or other classification of the packet determined by the classifier 315. For example, the DTS 335 can receive an indication that a packet includes audio or video content, retrieve an offset of 5 milliseconds (ms) for the audio or video content, and generate a departure time stamp which is 5 offset ms from the arrival time stamp. The departure time stamp can correspond to a time for the latency controller 300 to transmit the packet. For example, a latency budget can correspond to a target time which is a maximum time for transmission. According to various embodiments, the transmission time can include a maximum time, a target time, minimum time, or other time according to various performance metrics.

The latency controller 300 includes or is otherwise associated with a transmission scheduler 340, the transmission scheduler 340 including circuitry to schedule transmission between devices, or transmission between portions of a same device. For example, the transmission scheduler 340 can access an indication of time, such as a same indication of time employed by the ATS 310. The transmission scheduler 340 can schedule packets for transmission across a network via a network interface, in some embodiments. The transmission scheduler 340 can schedule packets for transmission to a processor local to a computing device, in some embodiments.

The transmission scheduler 340 can schedule transmission along the various flows of the data path 305 according to a departure time stamp generated by the DTS 335. The transmission of the transmission scheduler 340 can include transmission via any number of physical or logical connections to any number of destination devices. The transmission scheduler 340 can sequence one or more packets according to a sequence of a departure time stamp (e.g., prioritizing packets with an earliest deadline among departure time stamps). The transmission scheduler 340 can further schedule packets lacking a departure time stamp. For example, the transmission scheduler 340 can convey such packets according to a lower priority than packets including the departure time stamp (e.g., may only include such packets when no higher priority packets having an associated departure time stamp are present).

In some embodiments, the transmission scheduler 340 can schedule packets according to further data inputs. For example, the transmission scheduler 340 can preferentially schedule lower priority packets responsive to an indication of buffer occupancy of the queue associated with the lower priority packets (e.g., to prevent overflows). In some embodiments, the transmission scheduler 340 can interleave packets of various priorities where such interleaving does not violate a latency budget or other performance metric. For example, the transmission scheduler 340 can determine whether a delay incurred by the third queue 330 or the second queue 325 would violate a performance metric prior to servicing the first queue 320.

In some embodiments, the transmission scheduler 340 can cause a transmission of packets from the queues, or can include a memory space separate from the queues (e.g., a send buffer). In some embodiments, the transmission scheduler 340 is configured to re-order packets for transmission based at least on departure time stamps. Such re-ordering may be performed in, for example, the second queue 325 and third queue 330, in a send buffer, or in another location including packets from the queues 320, 325, 330. In some embodiments, the transmission scheduler 340 can reorder packets to effect a pacing or bursting mode. In some embodiments, the transmission scheduler can use the departure time stamp to transmit packets according to one of a pacing mode or a bursting mode. For example, such a re-ordering can be based on a determination that such re-ordering would not cause a transmission time to exceed a latency budget. In some embodiments, the re-ordering is based on an input received from the side channel link 355.

In some embodiments, the transmission scheduler 340 can operate according to predefined mode, such as a burst mode, interleaving mode, or the priority mode (e.g., as described above) according to an indication received from the classifier 315. Such an implementation may align data transport with application use which may, for example, reduce processing at a connected device or reduce average latency. For example, for video content, the provision of frame data may be provided in a burst mode corresponding to the busty data coinciding with frame transitions.

The transmission scheduler 340 can, regardless of a selected or indicated mode, service a queue to avoid violations of a latency budget or other performance metric, in some embodiments. For example, the transmission scheduler 340 can identify a packet for which the departure time stamp has passed (e.g., in a queue or other memory structure). Responsive to the identification, the transmission scheduler 340 can schedule the packet using a highest priority. Such a priority can include a highest queue priority, or another priority such as an immediate transmission or flag implemented locally at the transmission scheduler 340.

The transmission scheduler 340 or the DTS 335 can resolve inter-queue contention. For example, a first packet associated with a priority corresponding to a 4 ms latency budget can arrive 6 ms after a first packet associated with a priority corresponding to a 10 ms budget, such that each packet is provided with a same departure time stamp. In some embodiments, the DTS 335 may adjust one or more departure time stamps to prevent contention. In some embodiments, the transmission scheduler 340 can enforce a contention rule. For example, the transmission scheduler 340 can schedule a highest priority packet for earlier transmission or scheduling a first received packet for earlier transmission.

A configurator 345 can adjust the operation of various components of the latency controller 300. For example, the configurator 345 can provide or adjust classification criteria or thresholds to the classifier, a latency budget to the DTS 335 corresponding to a classification, a queue size or other behavior, or operation of the transmission scheduler 340. The configurator 345 can be or be in communication with various aspects of a system such as a broadband access server (BAS). For example, the configurator 345 can be or be in communication with IPS or other infrastructure such as a BQUICK ISP server 1012A, 1012B or a BQUICK_TOP server 1005.

Embodiment of the present disclosure can operate according to a latency budget or other performance metric. For example, in some embodiments, the transmission scheduler 340 can operate according to a latency target to reduce a deviation from the target latency time, (e.g., to reduce deviation from a target send time regardless of whether the deviation is additional or lesser latency). In some embodiments, the transmission scheduler 340 can schedule transmission to reduce average latency, maximum latency, etc. In some embodiments, the transmission scheduler 340 can drop a packet from a transmission schedule when the packet exceeds a latency budget. For example, in a streaming audio implementation employing UDP, it may be advantageous to drop a packet rather than to provide a packet at a time exceeding the latency budget. Another indication of transmission priority can differ from a latency budget. For example, network control data can include a high transmission priority but may include a relatively long budget. Conversely, streaming audio may permit dropping of a substantial number of packets (e.g., 0.1 percent) but may be associated with a low latency budget. The transmission scheduler 340 can schedule packets according to the latency budget or other indicia of priority.

FIG. 4 illustrates a state 400 of an input data stream 305 including various packets, according to some embodiments. Merely for simplicity, the input data stream 305 is depicted as a sequence of packets received over a serial link. In various embodiments of the present disclosure, the input data stream 305 may include multiple links (e.g., channels of a PCIe or AXI interface, multiple network interfaces, or so forth). Although the packets are depicted as regularly sized and without interstitial time, the data packets can vary in size or spacing (e.g., include spacings or bursts of data). The input data stream 305 includes various packets arranged according to an arrival time. For example, the arrival time may refer to an arrival time stamp provided by the ATS 310.

The input data stream 305 includes a first packet 405 received at a first time, a second packet 410 received at a second time, a third packet 415 received at a third time, a fourth packet 420 received at a fourth time, a fifth packet 425 received at a fifth time, a sixth packet 430 received at a sixth time, a seventh packet 435 received at a seventh time, and an eighth packet 440 received at an eighth time. For simplicity and brevity of this disclosure, the times are referred to as standard time units (e.g., T_0, T_1, T_2, and so on). However, implementations of the present disclosure can employ milliseconds, microseconds network defined time units (TU) such as the 1.024 ms TU of a Wi-Fi network, clock ticks of a hardware counter, or another time unit.

FIG. 5 illustrates a state 500 of multiple queues including the various packets of FIG. 4, according to some embodiments. For example, the queues can include the first queue 320, second queue 325, and third queue 330 of FIG. 3. The packets are shown as provided to the queues prior to establishment of a departure time stamp. However, departure time stamps are provided to show a relationship between the various queues and the departure time stamp and for continuity with FIG. 6, hereinafter. The second queue 325 has a departure time stamp offset by three time units, the third queue 330 has a departure time stamp offset by one time units, and the first queue 320 lacks a departure time stamp.

The first queue 320 may be associated with a longest latency budget, or may not be associated with a defined latency budget. For example, the classifier 315 can associate a low priority with such packets, according to a correspondence with an application or function (e.g., email, backup file transfers, print services, or background synch data). One or more flows (and channels) can correspond to the first queue. For example, the second packet 410 and sixth packets can be received from a same or different device, port, application, or other indicia of a flow. Likewise, the packets of the second queue 325 and third queue 330 can correspond to one or more flows associated therewith.

The second queue 325 may be associated with a latency budget greater than a latency budget of the first queue 320 and lesser than a latency budget of the third queue 330, such as a latency budget of three standard time units. For example, the classifier 315 can associate a moderate priority with such packets, according to a correspondence with an application or function (e.g., database queries, cloud services, or streaming video employing a buffer).

The third queue 330 can be associated with a lowest latency budget, such as a latency budget of one standard time unit. For example, the classifier 315 can associate a high priority with such packets, according to a correspondence with an application or function (e.g., voice traffic of a VOIP session, real time gaming traffic related to a virtual reality or augmented reality display, or network control data).

FIG. 6 illustrates a transmission schedule 600 including the various packets of FIG. 4 and FIG. 5, according to some embodiments. The packets are depicted according to a data stream 360 at the transmission scheduler 340, and are depicted with arrival time stamps for continuity with FIG. 5, though such arrival time stamps may be omitted from the packets. In the transmission schedule, the packets are ordered according to a departure time stamp, depicted in a separate time stamp field 610 corresponding to each of the packets of the second queue 325 and the third queue 330. Particularly, the departure time stamp for the packets of the second queue 325 are offset three standard time units from the arrival time stamp, and the departure time stamp for the packets of the third queue 330 are offset one standard time unit from the arrival time stamp. The packets of the first queue 320 are not provided with a departure time stamp, according to an implementation of the latency controller 300 in which the packets of the low priority flow are not provided a destination timestamp. In some embodiments, the packets of every queue can be assigned a departure time stamp.

A departure time field 615 indicates an actual departure time for the packets. In some embodiments, the departure time stamp may correspond to the actual departure time. Such an implementation can reduce jitter by providing packets with a predictable latency, even where such an approach may increase average or maximum latency. For example, a target latency, rather than a latency budget may be provided, such that the transmission scheduler 340 schedules transmission to match the actual transmission time as close to the departure time stamp as is possible for a particular data stream. However, in general, the departure time stamp does not necessarily correspond to an actual departure time. For example, as depicted, the actual departure time may transmit the various packets not later than the latency budget.

Although shown as transmitted according to a same rate as received, in some embodiments, a transmission rate can vary from a reception rate, according to a speed of a connection or number/identity of links. For example, the latency controller 300 can interface with a 40 gigabyte ethernet link or a PCIe link, and another link including multiple 2.5 gigabit Ethernet connections. Such a mismatch can further demonstrate the utility of the systems and methods provided herein. For example, where information received by a latency controller 300 exceeds the data the latency controller 300 can process or transmit in a time period (e.g., in a bursty system), the approaches described herein can maintain latency targets or budgets for at least prioritized traffic.

Figure 7:
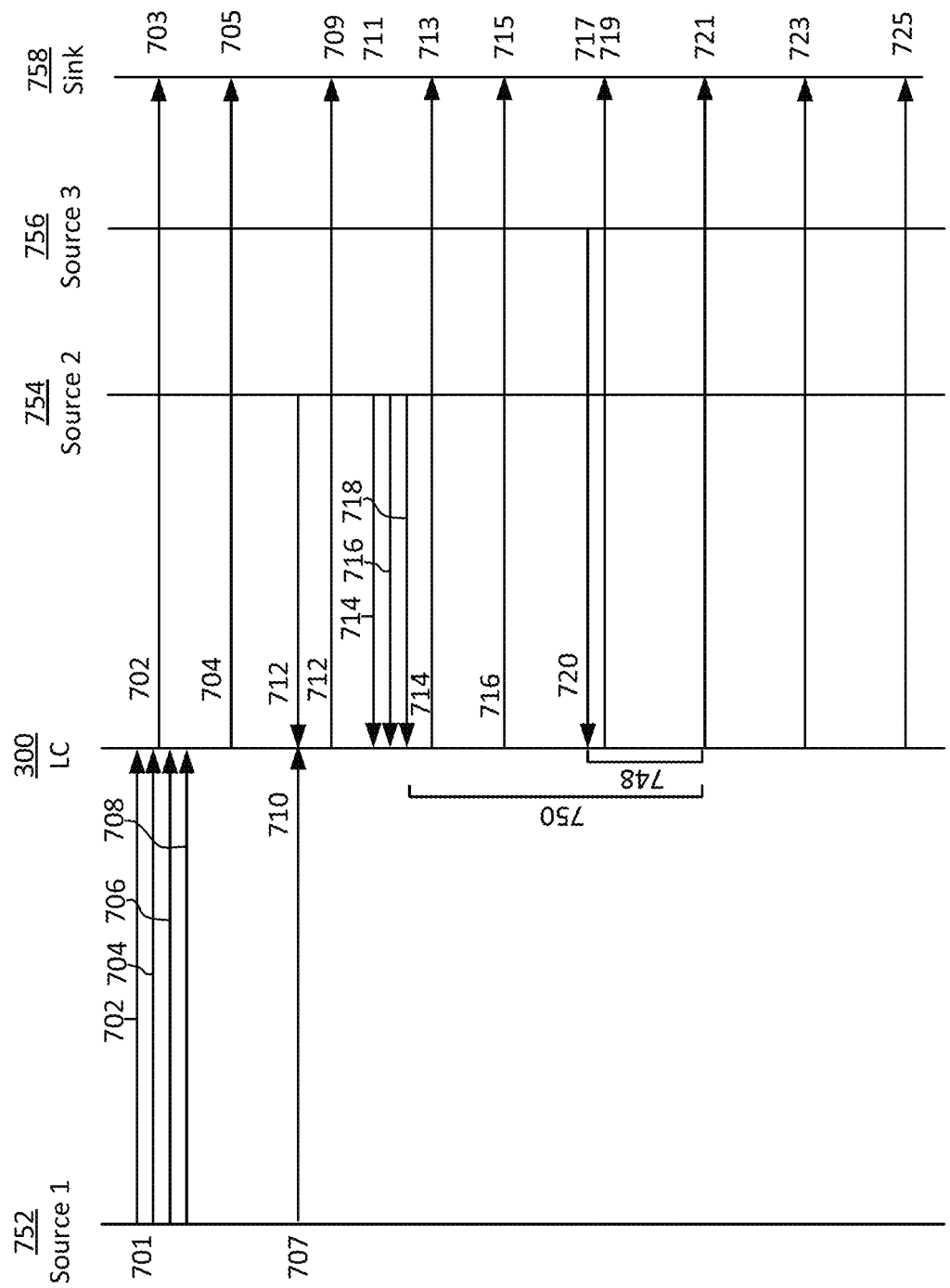
FIG. 7 illustrates a sequence diagram for a sequence of queue management for latency control, according to some embodiments.

FIG. 7 illustrates a sequence diagram 700 for a sequence of queue management for latency control, according to some embodiments. The sequence diagram 700 depicts a latency controller 300 receiving bursty input traffic and providing rate-limited data to a sink 758 for the information. In various embodiments, additional information sinks may be included. The input traffic includes a receipt of packets from a first source 752, second source 754, and third source 756. The sources described herein may correspond to a source device, source application, source port, or other data source. For the purposes of the present illustrative example, the first source 752 will be referred to as a low priority source, the second source 754 will be referred to as a medium priority source, and the third source 756 will be referred to as a high priority source.

At a first time 701, the latency controller 300 receives a burst of four packets, 702, 704, 706, 708. The latency controller 300 can determine that the burst of the four packets, 702, 704, 706, 708 are associated with a same priority (e.g., a low priority which is not associated with a departure time stamp). For example, the latency controller 300 can enqueue the burst of four packets 702, 704, 706, and 708 in a low priority queue corresponding to the first queue 320 of FIG. 3. At a second time 703, the latency controller 300 can begin transmitting the burst of four packets, beginning with the first packet 702 of the burst. The second time 703 is offset from the first time 701 according to data processing operations described herein or including a delay to accord to a predefined transmission time or window. At a third time 705, the latency controller 300 can send the second packet 704. Absent a receipt of further packets, the latency controller 300 may be configured to transmit the third packet 706 and fourth packets 708 in sequence, at the fifth time 709 and seventh time 713 respectively. However, at a fourth time 707, the latency controller receives a simultaneous fifth packet 710 from the first source 752 and sixth packet 712 from the second source 754. The simultaneous receipt can correspond to a simultaneous transmission over separate links or sequential transmissions which, according to an arrival time stamp, resolve to a same time of receipt (e.g., within a TU).

The latency controller 300 can determine a departure time stamp for the sixth packet 712 and schedule the sixth packet 712 for transmission to the sink 758 according to the departure time stamp (e.g., the latency controller 300 can schedule a higher priority packet for transmission at a next available transmission time). For example, the latency controller 300 can enqueue the sixth packet 712 in a priority queue corresponding to the second queue 325 of FIG. 3. Thus, at the fifth time 709, the latency controller can transmit the sixth packet 712, rather than the third packet 706.

At a sixth time 711, the latency controller 300 can receive a seventh packet 714, an eighth packet 716, and a ninth packet 718 from the second source 754. The latency controller 300 can determine departure time stamps for the packets, and, based on the time stamps or the buffer priorities, schedule the packets for transmission. According to the transmission schedule, the latency controller 300 can transmit the seventh packet 714 at a seventh time 713, and the eighth packet 716 at an eighth time 715. Absent a receipt of further packets, the latency controller 300 may be configured to transmit the ninth packet 718 at a tenth time 719.

However, at a ninth time 717, prior to the tenth time 719, the latency controller 300 receives a tenth packet 720 from the third source 756. The latency controller 300 can generate a departure time stamp for the tenth packet 720. For example, the latency controller 300 can enqueue the tenth packet 720 in a priority queue corresponding to the third queue 330 of FIG. 3. Upon a receipt of the tenth packet, the latency controller 300 is enqueuing the low priority third packet 706 and fourth packet 708, as well as the priority packets of the ninth packet 718 and tenth packet 720.

According to a latency budget associated with respective queues for the ninth packet 718 and tenth packet 720, the latency controller 300 may schedule either of the ninth packet 718 or tenth packet 720 in a next available transmission window. That is, the latency controller 300 may schedule a later received higher priority packet subsequent to an earlier received lower priority packet, in some embodiments. For example, if a first offset 748 between an arrival time stamp and a scheduled transmission time for the tenth packet 720 would exceed a latency budget, the tenth packet 720 may be scheduled at the tenth time 719. If a second offset 750 between an arrival time stamp and a scheduled transmission time for the ninth packet 718 exceeds a latency budget, the ninth packet 718 is scheduled at the tenth time 719 (as is depicted), with the tenth packet 720 being transmitted thereafter, at the eleventh time 721. The latency controller can thereafter continue to clear the buffers of low priority data at a twelfth time 723, thirteenth time 725, and fourteenth time, absent a receipt of further data.

FIG. 8 illustrates a flow diagram for a method 800 of queue management for latency control, according to some embodiments. The method may be performed by a latency controller 300. The latency controller 300 can include or communicatively couple with an arrival time stamper 310, classifier 315, transmission scheduler 340, and queues of channels including a queue of a low priority channel, and multiple queues of a high priority channel. The method includes receiving packets at operation 805. The method includes classifying flows corresponding to the packets at operation 810, based on a type of application. The method includes determining a queue and a departure time stamp for each packet at operation 815. The method includes communicating packets with the departure time stamp to a corresponding queue based on the type of application at operation 820. The operations of the present method 800, like other operations provided herein may be performed in the depicted order, in another order, or one or more operations can be performed simultaneously. Operations can be omitted, added, substituted or modified according to the present disclosure.

Referring again to operation 805, the latency controller 300 receives multiple packets of multiple flows. For example, the flows can correspond to a source device, application, address, or other information available to the classifier 315. The latency controller 300 can receive the packets including an arrival time stamp. For example, the latency controller 300 can include an ATS 310 to generate the time stamp prior to transmission to another component of the latency controller 300 or the latency controller 300 can receive the packets in a flow of a data stream via the ATS 310. The latency controller can be configured to use a higher priority channel and a lower priority channel to communicate packets from the multiple flows. For example, the latency controller 300 can use the lower priority channel using a first queue to queue lower priority packets for transmission, and the higher priority channel using one or more second queues for transmission of higher priority packets. At least the higher priority packets can have a latency budget based on a type of application.

In some embodiments, the first queue and the one or more second queues (e.g., the second queue 325 and third queue 330 of FIG. 3) are implemented on a same device. In some embodiments, the first queue and the one or more second queues are implemented across a plurality of different devices in network communication with each other. That is, the latency controller 300 may be implemented as a distributed controller, in some embodiments. The devices implementing all or a portion of the queues or other portions of the latency controller 300 can include, for example, an access point, a cable modem, a cable modem termination system, an endpoint such as a client device or server, a router, or other network connected device.

Referring again to operation 810, the latency controller 300 classifies each of the plurality of flows for transmission. For example, the classification of the plurality of flows may be affected on a per-packet basis, per-queue basis, or other basis. The classification can be based on a type of application. For example, the type of application can include video or audio (e.g., the packets may be classified as video packets or audio packets). The classification can correspond to either a higher priority via the higher priority channel or lower priority via the lower priority channel. The higher priority channel (or packets associated therewith) may be associated with a further gradated priority. For example, the latency controller 300 can classify the higher priority flows based at least on the type of application being one of video or audio. For example, streaming audio or video may be provided with a higher priority. The higher priority can correspond to a lower latency time.

Referring again to operation 815, the latency controller 300 determines a queue of the one or more second queues to use for transmission. The latency controller 300 further determines a departure time stamp for each of the packets according to the latency budget for the type of application. The latency controller 300 can make such determinations for packets of each of the plurality of flows classified as higher priority, or all packets. In some embodiments, determination of the departure time stamp may be coincident with the determination of the queue. For example, each queue can be associated with a predefined latency time, such that the departure time stamp is defined by the sum of the arrival time stamp and the latency time. In some embodiments, the determination of the time stamp can vary from the determination of the queue. For example, the departure time stamp may be adjusted according to a finer gradation than the selection of the queue. In some embodiments, to determine the departure time stamp, the latency controller 300 sums an arrival time stamp plus a latency time for the latency budget assigned to each queue. The sum may be the departure time stamp, or the latency controller 300 can determine a time stamp based on such a value.

In some embodiments, the latency controller 300 re-orders packets in the one or more second queues based at least on departure time stamps. For example, the latency controller 300 can adjust an order to place a higher priority packet (e.g., having an earlier departure time stamp) closer to an output of a FIFO, or otherwise cause an earlier transmission. In some embodiments, the re-ordering can include discarding packets, such as packets which have exceeded a latency budget. In some embodiments, the re-ordering can advance packets having exceeded a latency budget for immediate transmission.

Referring again to operation 820, the latency controller 300 communicates each of the higher priority packets with the departure time stamp to a corresponding queue of the one or more second queues based on the type of application. Such communication can cause the higher priority packets to be received by a transmission scheduler 340 (e.g., a transmission scheduler 340 of or otherwise in network communication with the latency controller 300). In some embodiments, the latency controller 300 further communicates lower priority flows of packets, without the departure time stamp, to the first queue for the lower priority channel. Upon a receipt of the higher priority packets, the transmission scheduler 340 can prioritize transmission of the higher priority packets from the one or more second queues based at least on the departure time stamp. The transmission scheduler 340 can further schedule transmission of the lower priority packets, such as based on a FIFO schema, best effort basis, or according to further performance metrics.

In some embodiments, the transmission scheduler 340 prioritizes packets from the one or more second queues for transmission with an earliest deadline among departure time stamps. In some embodiments, the transmission scheduler 340 re-orders packets for transmission from the one or more second queues based at least on departure time stamps. For example, a departure time stamp or other deadline may pass prior to transmission. The transmission scheduler 340 can identify that the departure time stamp has passed and schedule the one or more packets using a highest priority. The highest priority can correspond to a queue or other transmission scheduler 340 priority. In another example, the transmission scheduler can re-order packets according to a pacing mode or a bursting mode. In some embodiments, the transmission scheduler 340 can otherwise use the departure time stamp of packets in the one or more second queues to transmit packets according to one of a pacing mode or a bursting mode.

In some embodiments, the device (e.g., the latency controller 300) can include the arrival time stamp with each of the plurality of packets along the flow. For example, the arrival time stamp can be provided to the transmission scheduler 340 which may determine a transition sequence based thereon.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure may reference terms such as "first" and "second" in connection with devices, mode of operation, transmit chains, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment. The terms coupled or connected includes indirect and direct couplings and connections.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure. The headings provided in this document are non-limiting.

The applications and servers have been described above with the aid of functional building blocks illustrating the performance of certain significant functions. The boundaries of these functional building blocks have been arbitrarily defined for convenience of description. Functions and structures can be integrated together across such boundaries. Alternate boundaries could be defined as long as the certain significant functions are appropriately performed. Similarly, flow diagram blocks may also have been arbitrarily defined herein to illustrate certain significant functionality. To the extent used, the flow boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

We claim:

1. A method comprising:
   receiving, by a latency controller on a device, a plurality of packets of a plurality of flows, each of the plurality of packets including an arrival time stamp, the latency controller using a higher priority channel and a lower priority channel to communicate packets from each of the plurality of flows, the lower priority channel using a first queue to queue packets for transmission of lower priority packets and the higher priority channel using one or more second queues, each having a latency budget based at least on a type of application, for transmission of higher priority packets;
   classifying, by the latency controller based at least on the type of application, each of the plurality of flows for transmission as either higher priority via the higher priority channel or lower priority via the lower priority channel;
   determining, by the latency controller, for packets for each of the plurality of flows classified as higher priority, a queue of the one or more second queues to use for transmission and a departure time stamp for each of the packets according to the latency budget for the type of application; and
   communicating, by the latency controller, each of the higher priority packets with the departure time stamp to a corresponding queue of the one or more second queues based at least on the type of application, wherein a transmission scheduler prioritizes transmission of packets from the one or more second queues based at least on the departure time stamp.

2. The method of claim 1, further comprising including, by the device, the arrival time stamp with each of the plurality of packets.

3. The method of claim 1, further comprising determining, by the latency controller, the departure time stamp based at least on the arrival time stamp plus a latency time for the latency budget assigned to each queue of the one or more second queues.

4. The method of claim 1, further comprising classifying, by the latency controller, the higher priority flows based at least on the type of application being one of video or audio.

5. The method of claim 1, further comprising communicating, by the latency controller, packets of lower priority flows of packets, without the departure time stamp, to the first queue for the lower priority channel.

6. The method of claim 1, wherein the transmission scheduler identifies, for one or more packets in the one or more second queues, that the departure time stamp has passed and schedules the one or more packets using a highest priority.

7. The method of claim 1, wherein the transmission scheduler prioritizes packets from the one or more second queues for transmission with an earliest deadline among departure time stamps.

8. The method of claim 1, wherein the transmission scheduler re-orders packets for transmission from the one or more second queues based at least on departure time stamps.

9. The method of claim 1, wherein the latency controller re-orders packets in the one or more second queues based at least on departure time stamps.

10. The method of claim 1, wherein the first queue and the one or more second queues are implemented on one of a same device or across a plurality of different devices.

11. The method of claim 1, wherein the latency controller is on the device comprising one of the following: an access point, a cable modem, a cable modem termination system, an optical line terminal (OLT), an optical network unit (OLU), a digital subscriber line (DSL), or a digital subscriber line access multiplexor (DSLAM).

12. The method of claim 1, wherein the transmission scheduler uses the departure time stamp of packets in the one or more second queues to transmit packets according to one of a pacing mode or a bursting mode.

13. A system comprising:
   a latency controller on a device in communication with a first queue for a lower priority channel and one or more second queues for one or more higher priority channels to communicate packets, each of the one or more second queues associated with a latency budget based at least on a type of application;
   wherein the latency controller is configured to:
      receive a plurality of packets of a plurality of flows, each of the plurality of packets including an arrival time stamp, using a higher priority channel and the lower priority channel to communicate packets from each of the plurality of flows, the lower priority channel using the first queue to queue packets for transmission of lower priority packets and the higher priority channel using the one or more second queues, each having the latency budget based at least on the type of application, for transmission of higher priority packets;
      classify, based at least on the type of application, each of the plurality of flows for transmission as either higher priority via the one or more higher priority channels or lower priority via the lower priority channel;
      determine for packets for each of the plurality of flows classified as higher priority, a queue of the one or more second queues to use for transmission and a departure time stamp for each of the packets according to the latency budget for the type of application; and communicate each of the higher priority packets with the departure time stamp to a corresponding queue of the one or more second queues based at least on the type of application, wherein a transmission scheduler prioritizes transmission of packets from the one or more second queues based at least on the departure time stamp.

14. The system of claim 13, wherein the latency controller is further configured to determine the departure time stamp based at least on the arrival time stamp plus a latency time for the latency budget assigned to each queue of the one or more second queues.

15. The system of claim 13, wherein the latency controller is further configured to classify the higher priority flows based at least on the type of application being one of video or audio.

16. The system of claim 13, wherein the latency controller is further configured to include the departure time stamp with each of the packets being communicated to the corresponding queue of the one or more second queues.

17. The system of claim 13, wherein the transmission scheduler prioritizes transmission of packets from the one or more second queues according to earliest departure time stamps.

18. A system comprising:
a network device in a computing environment of a first network, the network device providing access to the Internet and one or more second networks to one or more devices in the computing environment of the first network;
a latency controller on the network device configured to:
identify an arrival time stamp for packets for a plurality of flows being communicated to the one more devices;
classify, based at least on a type of application, each of the plurality of flows for transmission as either higher priority or lower priority;
determine for packets of each of the plurality of flows classified as higher priority, a departure time stamp for each of the packets according to a latency budget for the type of application; and
communicate each of the higher priority packets with the departure time stamp to a corresponding queue of one or more queues based at least on the type of application for transmission according to the departure time stamp.

19. The system of claim 18, wherein the network device comprises one of an access point, a cable modem, a cable modem termination system, an optical line terminal (OLT), an optical network unit (OLU), a digital subscriber line (DSL), or a digital subscriber line access multiplexor (DSLAM).

20. The system of claim 18, wherein a transmission scheduler prioritizes transmission of packets from the one or more queues to the one or more devices according to an earliest departure time.

* * * * *